United States Patent
Shimizu et al.

(10) Patent No.: US 6,620,339 B1
(45) Date of Patent: Sep. 16, 2003

(54) POLYAMIC ACID COMPOSITION, LIQUID CRYSTAL ALIGNING FILM, AND LIQUID CRYSTAL DISPLAY ELEMENT

(75) Inventors: Itsuo Shimizu, Ichihara (JP); Kumiko Hara, Kisarazu (JP); Haruo Kato, Ichihara (JP); Satoshi Tanioka, Ichihara (JP); Shizuo Murata, Ichihara (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/581,852

(22) PCT Filed: Nov. 16, 1998

(86) PCT No.: PCT/JP98/05147

§ 371 (c)(1),
(2), (4) Date: Jun. 19, 2000

(87) PCT Pub. No.: WO99/33902

PCT Pub. Date: Jul. 8, 1999

(30) Foreign Application Priority Data

Dec. 29, 1997 (JP) ................................. 9/368090

(51) Int. Cl.[7] ........................ C09K 19/12; C09K 19/00
(52) U.S. Cl. ................. 252/299.66; 252/299.01; 252/299.68; 481/1.1; 481/1.2; 481/1.26; 481/1.27; 481/1.52; 481/473.5
(58) Field of Search .................... 252/299.01, 299.66, 252/299.68; 428/1.1, 1.2, 1.26, 1.27, 1.52, 473.5

(56) References Cited

U.S. PATENT DOCUMENTS 4,921,728 A * 5/1990 Takiguchi et al. ........... 528/10
5,041,513 A * 8/1991 Okinoshima et al. ......... 528/10
5,053,544 A * 10/1991 Murata et al. .............. 564/430
5,084,557 A * 1/1992 Murata et al. .............. 528/353
5,262,379 A * 11/1993 Bailey et al. ............... 503/227
5,447,759 A   9/1995 Murata et al.
5,674,575 A * 10/1997 Abe et al. ..................... 428/1

FOREIGN PATENT DOCUMENTS

| EP | 0 389 092 | 9/1990 |
| EP | 0 601 813 | 6/1994 |
| EP | 0 708 077 | 4/1996 |
| JP | 63-084924 | 4/1988 |
| JP | 7-120768  | 5/1995 |
| JP | 8-106097  | 4/1996 |

* cited by examiner

*Primary Examiner*—Yogendra N. Gupta
*Assistant Examiner*—Derrick G. Hamlin
(74) *Attorney, Agent, or Firm*—McDermott, Will & Emery

(57) ABSTRACT

The present invention provides a polyimide alignment film having excellent electrical properties and excellent reliability for use in the field of electronic materials which comprises a polyimide resin produced from a polyamic acid composition comprising a polyamic acid forming a polyimide resin of a low residual voltage and a high voltage holding ratio, and a polyamic acid forming a polyimide resin of a large pre-tilt angle, blended them in the ratio of the former to the latter of 50/50 to 95/5 (weight ratio), a polyamic acid composition for providing such a polyimide aligning film and a liquid crystal display element produced from such an aligning film.

17 Claims, 4 Drawing Sheets

POLYAMIC ACID COMPOSITION, LIQUID CRYSTAL ALIGNING FILM, AND LIQUID CRYSTAL DISPLAY ELEMENT

TECHNICAL FIELD

The present invention relates to a polyimide aligning film which excels in electrical properties and reliability for the field of electronic materials, in particular for a liquid crystal aligning film; to a polyamic acid composition for providing such an aligning film; and to a liquid crystal display element produced from such an aligning film.

BACKGROUND ART

The present mainstream of liquid crystal display elements is that utilizing nemetic liquid crystals. Liquid crystal display elements presently in practical use include a matrix TN element twisted by 90°, an STN element usually twisted by 180° or more, and a TFT liquid crystal display element utilizing thin film transistors. In addition to these, IPS (In Plane Switching) mode having improved viewing angle properties has been developed. The progress of liquid crystal display elements is not limited to only these modes, but active efforts to improve peripheral materials have been made toward improvement of the properties of liquid crystal display elements.

With the wider use of liquid crystal display elements in various fields, liquid crystal display elements having improved properties have been demanded. Such demands include better display performance and higher reliability in long-time use. In particular, important factors for TFT liquid crystal display elements are electrical properties, especially the voltage holding ratio and the residual voltage. If the voltage holding ratio is low, the voltage applied to liquid crystals during the field period lowers, causing the problem of lowered contrast. Therefore, a higher voltage holding ratio is desired, and ideally, the voltage holding ratio should be 100%.

On the other hand, if the residual voltage is large, it will remain even after the electric field has been turned off after being once turned on. In such a case, images to be erased will remain as residual images. Therefore, it is desired that the residual voltage approach zero infinitesimally. This residual image phenomenon is one of the most important issues in liquid crystal display elements.

Another problem in liquid crystal display element is an increase in the electric current of the display element occurring during long-term use. The increase in the electric current lowers the voltage applied to the liquid crystal itself and raises liquid crystal molecules insufficiently, thus lowering contrast, and in some cases failing to display images.

Furthermore, in manufacturing processes for liquid crystal display elements, the stability of properties of the display elements is an important factor to achieve process margin. For example, if the pre-tilt angle of liquid crystals changes significantly with solvent evaporation conditions after coating of an alignment material, with imidizing (normally heating) conditions of a polyamic acid, or with annealing conditions after injection of liquid crystals, elements having a stable pre-tilt angle cannot be manufactured unless the process conditions are strictly controlled for each process.

When TFT elements were first marketed, the pre-tilt angle of liquid crystals for a TFT element was required to be nearly 0 degrees. In recent years, however, liquid crystals have been required to have some pre-tilt angle (3 to 12 degrees) in order to inhibit the occurrence of domains.

An object of the present invention is to provide a liquid crystal aligning film for producing a liquid display element having a pre-tilt angle required for TFT display elements, small manufacturing process dependence of the pre-tilt angle, little residual voltage of the liquid crystal display element, and high voltage holding ratio, as well as high reliability.

The prior art for producing an element having a small residual voltage and a high voltage holding ratio suited for TFT display elements is disclosed in, for example, Japanese Patent Application Laid-open No. 8-106097. In this reference, a tetracarboxylic dianhydride having aromatic groups, aliphatic groups, or a combination of aromatic and aliphatic groups is used as a tetracarboxylic acid component, and a diamine having ether groups is used as a main diamine component, but a large effect cannot be obtained. The pre-tilt angle is as small as 1.3 to 3.6 degrees.

In Japanese Patent Application Laid-open No. 7-120768 is disclosed an alignment material containing a polyamic acid having an aliphatic tetracarboxylic dianhydride as its essential component and a polyamic acid having an aromatic tetracarboxylic dianhydride as its essential component. Although this reference describes that siloxane-based diamines have particularly excellent properties, experiments conducted by the present inventors show that the residual voltage is small but alignment is poor. Also, no diamine components that increase the tilt angle are described.

DISCLOSURE OF INVENTION

The inventors of the present invention conducted repeated examinations for solving the above problems, and found that the above object was achieved by a polyimide film used as a polymer component of a liquid crystal aligning film used in liquid crystal elements, which film is formed by heat-curing a polyamic acid composition comprising a polyamic acid that provides a polyimide resin giving a small residual voltage and a high voltage holding ratio, and a polyamic acid that provides a polyimide resin giving a large pre-tilt angle.

According to a first aspect of the present invention, there is provided a polyamic acid composition comprising a polyamic acid providing a polyimide resin giving a small residual voltage and a high voltage holding ratio, and a polyamic acid providing a polyimide resin giving a large pre-tilt angle, the ratio (weight ratio) of the former to the latter being 50/50 to 95/5.

According to a second aspect of the present invention, there is provided a polyamic acid composition comprising a polyamic acid A and a polyamic acid B, wherein the essential acid component of the polyamic acid A is an alicyclic tetracarboxylic dianhydride, the diamine component of the polyamic acid A is a diamine having at least one of the aromatic diamines represented by the following formula (1), the acid component of the polyamic acid B contains 50 mole % or more aromatic tetracarboxylic dianhydride, and the essential diamine component of the polyamic acid B is a diamine having a group enabling the pre-tilt angle of a liquid crystal to be increased on the side chain thereof, the ratio A/B of the polyamic acid A to the polyamic acid B being 50/50 to 95/5 (by weight).

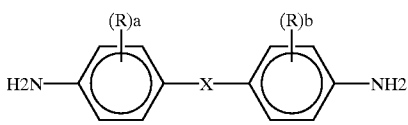
(1)

where, X is a divalent aliphatic group, each R is independently a hydrogen atom or $CH_3$, and a and b are 1 or 2.

According to a third aspect of the present invention, there is provided a polyamic acid composition according to the second aspect, wherein the acid component of the polyamic acid A comprises an alicyclic tetracarboxylic dianhydride and an aromatic tetracarboxylic dianhydride.

According to a fourth aspect of the present invention, there is provided a polyamic acid composition according to the second aspect, wherein the diamine component of the polyamic acid B comprises at least one diamine having a group enabling the pre-tilt angle of a liquid crystal to be increased on the side chain thereof, and a diamine represented by the formula (1).

According to a fifth aspect of the present invention, there is provided a polyamic acid composition according to the second aspect, wherein the essential diamine component of the polyamic acid B comprises at least one of the diamines represented by the following formulas (2) and (3).

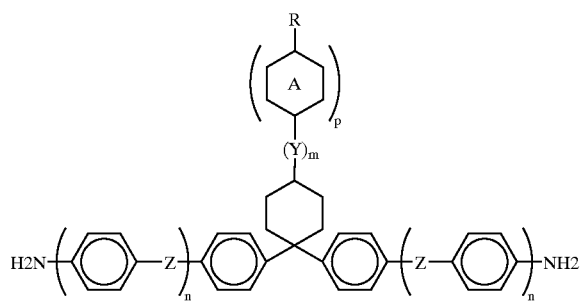
(2)

where R is a hydrogen atom or an alkyl group having 1 to 12 carbon atoms, Y is a $CH_2$ group, m is an integer from 0 to 2, A is a benzene ring or a cyclohexane ring, p is 0 or 1, z is an oxygen atom or a $CH_2$ group, and n is 0 or 1.

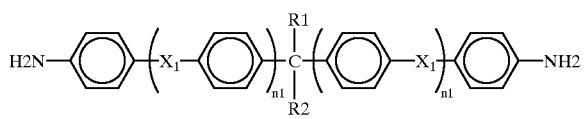
(3)

where, X1 is a $CH_2$ group or an oxygen atom, each of R1 and R2 are individually a hydrogen atom, an alkyl group or a perfluoroalkyl group having 1 to 12 carbon atoms; at least one of R1 and R2 being an alkyl group or a perfluoroalkyl group having 3 or more carbon atoms; and n1 is 0 or 1.

According to a sixth aspect of the present invention, there is provided a polyamic acid composition according to the second aspect, wherein the diamine component of polyamic acid B comprises at least one of the diamines represented by formulas (2) and (3), and the diamine represented by formula (1).

According to a seventh aspect of the present invention, there is provided a polyamic acid composition according to the second aspect, wherein the acid component of the polyamic acid A comprises an alicyclic tetracarboxylic dianhydride and an aromatic tetracarboxylic dianhydride, and the diamine component of the polyamic acid B comprises at least one of the diamines represented by formulas (2) and (3), or a diamine comprising said diamine and the diamine represented by formula (1).

According to an eighth aspect of the present invention, there is provided a polyamic acid composition according to the second aspect, wherein the acid component of the polyamic acid A comprises an alicyclic tetracarboxylic dianhydride and an aromatic tetracarboxylic dianhydride, the ratio of the former to the latter being 90/10 to 10/90 (mole ratio), and the diamine component of the polyamic acid B comprises at least one of the diamines represented by formulas (2) and (3), or a diamine comprising said diamine and the diamine represented by formula (1).

According to a ninth aspect of the present invention, there is provided a polyamic acid composition according to the second aspect, wherein the main acid component of the tetracarboxylic dianhydride of the polyamic acid A is cyclobutane tetracarboxylic dianhydride, the acid component of the polyamic acid B contains 50 mole % or more pyromellitic dianhydride, and the diamine component of the polyamic acid B comprises at least one of the diamines represented by formulas (2) and (3), or a diamine comprising said diamine and the diamine represented by formula (1).

According to a tenth aspect of the present invention, there is provided a polyamic acid composition according to the second aspect, wherein the acid component of the tetracarboxylic dianhydride of the polyamic acid A comprises cyclobutane tetracarboxylic dianhydride and pyromellitic dianhydride, and the diamine component of the polyamic acid B comprises at least one of the diamines represented by formulas (2) and (3), or a diamine comprising said diamine and the diamine represented by formula (1).

According to an eleventh aspect of the present invention, there is provided a polyamic acid composition according to the second aspect, wherein the acid component of the tetracarboxylic dianhydride of the polyamic acid A comprises cyclobutane tetracarboxylic dianhydride and pyromellitic dianhydride, the acid component of polyamic acid B contains 50 mole % or more pyromellitic dianhydride, and the diamine component of the polyamic acid B comprises at least one of a diamine represented by formula (2) and a diamine represented by formula (3), or a diamine comprising said diamine and the diamine represented by formula (1).

According to a twelfth aspect of the present invention, there is provided a polyamic acid composition according to the second aspect, wherein the acid component of the polyamic acid A comprises pyromellitic dianhydride and cyclobutane tetracarboxylic dianhydride, the ratio of the former to the latter being 90/10 to 10/90 (mole ratio); and the acid component of the polyamic acid B containing 50 mole % or more of pyromellitic dianhydride, and the diamine component of the polyamic acid B comprises at least one of the diamine represented by formula (2) and a diamine represented by formula (3), or a diamine comprising said diamine and the diamine represented by formula (1).

According to a thirteenth aspect of the present invention, there is provided a polyamic acid composition according to the second aspect, wherein the acid component of the polyamic acid A comprises pyromellitic dianhydride and cyclobutane tetracarboxylic dianhydride, the ratio of the former to the latter being 90/10 to 10/90 (mole ratio), the diamine component of the polyamic acid A is a diamine represented by formula (1), where X is $CH_2$ or $CH_2CH_2$, and each R is a hydrogen atom; the acid component of the polyamic acid B contains 50 mole % or more pyromellitic dianhydride, and the diamine component of polyamic acid B comprises at least one of a diamine represented by formula (2) and a diamine represented by formula (3), or a diamine comprising said diamine and the diamine represented by formula (1).

According to a fourteenth aspect of the present invention, there is provided an aligning film containing a polyimide resin obtained from a composition according to any one of the first through thirteenth aspects.

According to a fifteenth aspect of the present invention, there is provided a liquid crystal display element using an aligning film for a liquid crystal display element according to the fourteenth aspect.

According to a sixteenth aspect of the present invention, there is provided a TFT liquid crystal display element according to the fifteenth aspect using a liquid crystal composition mainly comprising the following compounds:

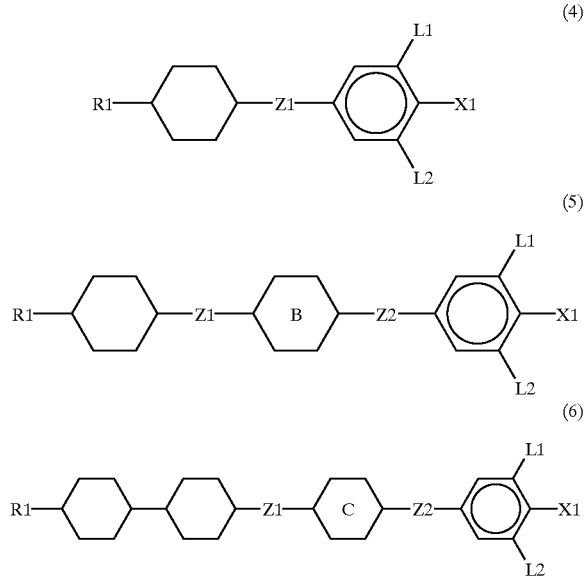

where, R1 represents an alkyl group having 1 to 10 carbon atoms, in which optional, nonadjacent methylene groups may be substituted by —O— or —CH=CH—, and optional hydrogen atoms of the group may be substituted by fluorine atoms; X1 represents a fluorine atom, a chlorine atom, —OCF$_3$, —OCF$_2$H, —CF$_3$, —CF$_2$H, —CFH$_2$, —OCF$_2$CF$_2$H, or —OCF$_2$CFHCF$_3$; each of L1 and L2 independently represents a hydrogen atom or a fluorine atom; each of Z1 and Z2 independently represents 1,2-ethylene, 1,4-butylene, —COO—, —CF$_2$O—, —OCF$_2$—, —CH=CH—, or a single bond; Ring B represents trans-1,4-cyclohexylene, 1,3-dioxane-2,5-diyl, or 1,4-phenylene in which hydrogen atoms may be substituted by fluorine atoms; and Ring C represents trans-1,4-cyclohexylene, or 1,4-phenylene in which hydrogen atoms may be substituted by fluorine atoms.

According to a seventeenth aspect of the present invention, there is provided a liquid crystal alignment material containing a polyamic acid composition according to the second aspect.

Vs is a square wave of a gate pulse width of 69 μs, a frequency of 60 Hz, and an amplitude of ±4.5 V.

Figure 2:
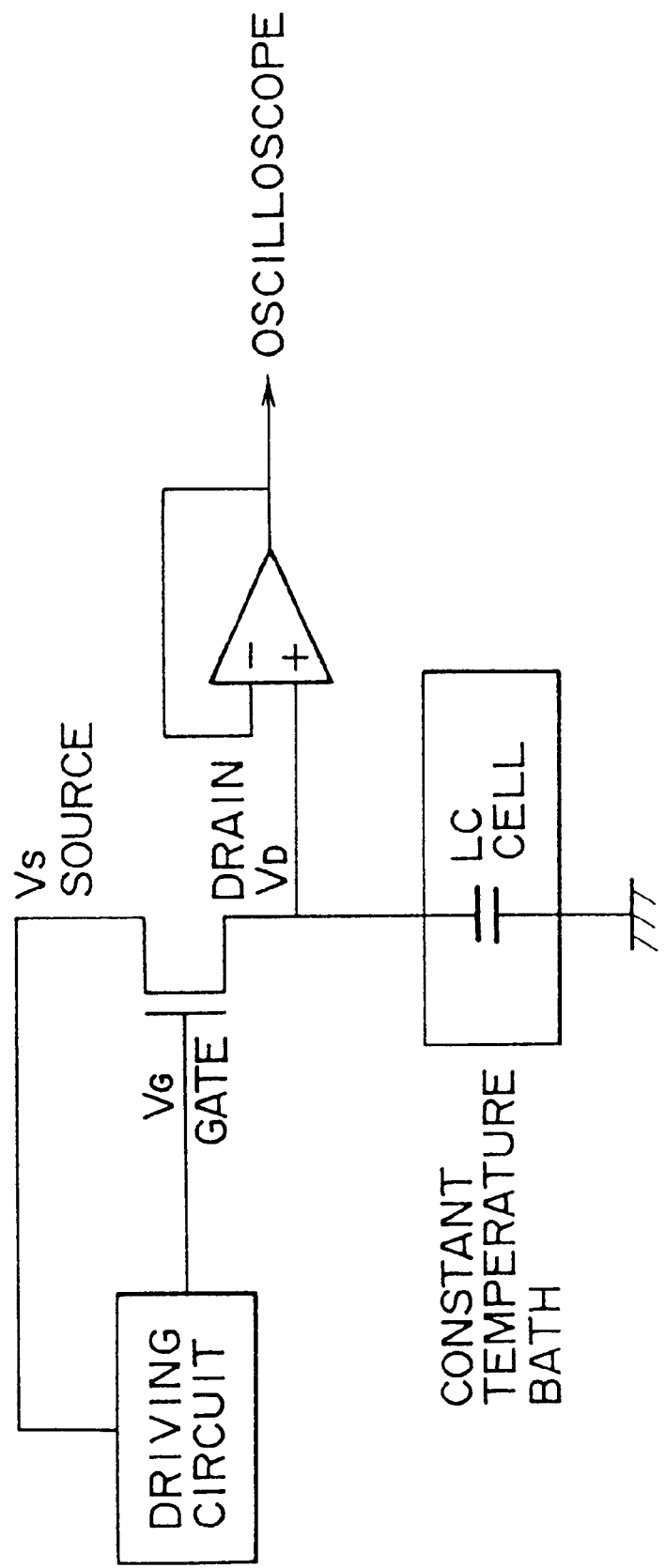
FIG. 2 is a circuit diagram used for measuring voltage holding ratios.

Vd is a waveform read from an oscilloscope when Vs is impressed to the source of a circuit shown in FIG. 2.

PREFERRED EMBODIMENTS

The present invention will be described in detail below.

When a polyamic acid providing a polyimide resin giving a low residual voltage and a high voltage holding ratio is called polyamic acid A, the essential acid component of the polyamic acid A is an alicyclic tetracarboxylic dianhydride, preferably, a component consisting mainly of an alicyclic tetracarboxylic dianhydride and an aromatic tetracarboxylic dianhydride. The diamine component of the polyamic acid A is a component based on at least one aromatic diamine represented by formula (1). Unless otherwise specified, however, a plurality of components may be used. This also applies to the following description.

On the other hand, when a polyamic acid providing a polyimide resin giving a large pre-tilt angle is called polyamic acid B, the main acid component of the polyamic acid B is an aromatic tetracarboxylic dianhydride, which may be the same as the aromatic tetracarboxylic dianhydride of the polyamic acid A. The essential diamine component of the polyamic acid B is a component comprising at least one diamine component having a side chain group that can increase the pre-tilt angle of the liquid crystal, or a diamine component containing the above diamine component and the diamine component shown in Formula (1).

Figure 4:
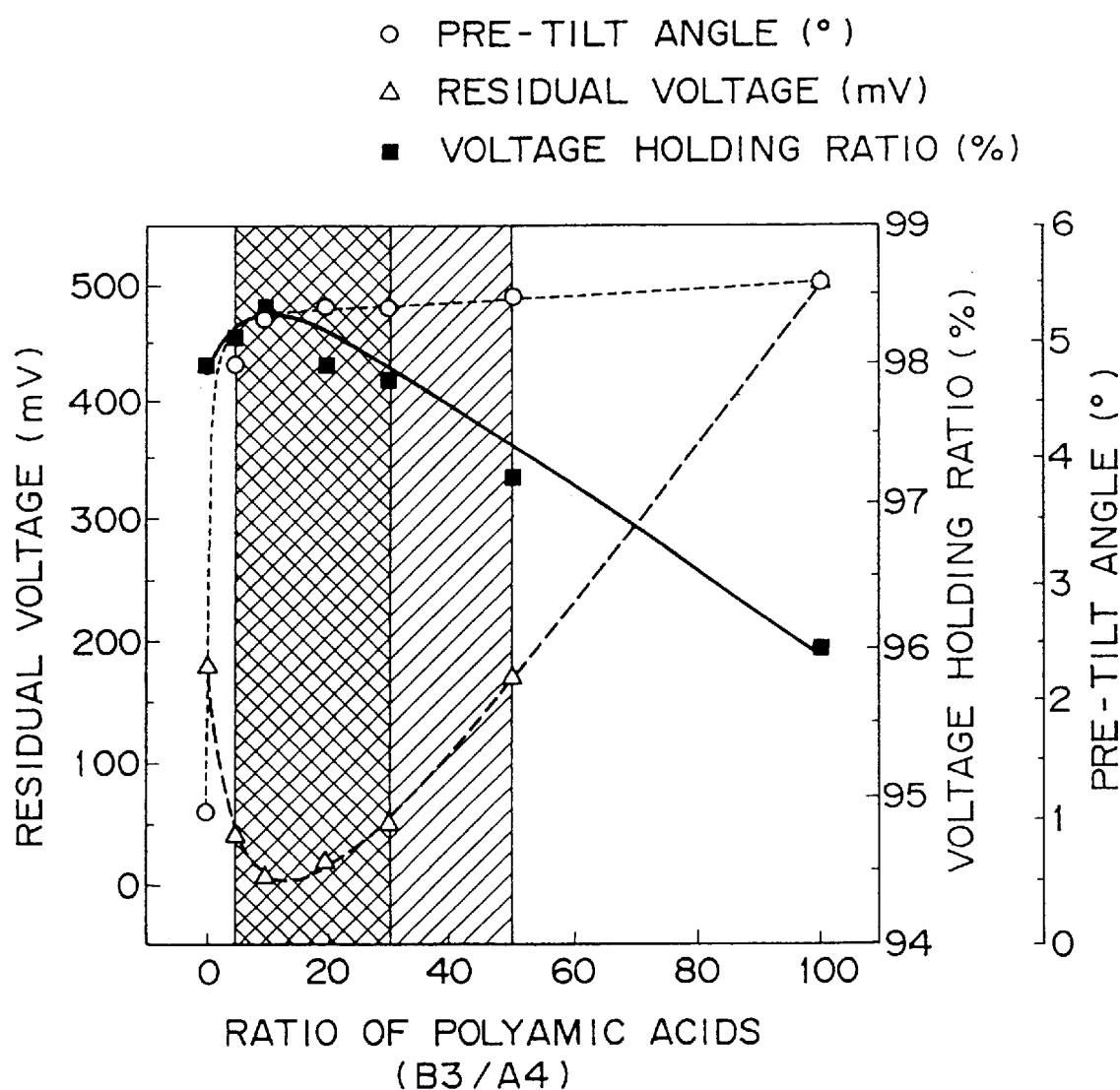
FIG. 4 is a diagram showing the relationship between the percentage of the polyamic acid in the composition of the present invention (the hatched area) and the pre-tilt angle, voltage holding ratio, and residual voltage, and is a graphic presentation of Table 9.

The ratio A/B of the polyamic acid A to the polyamic acid B is between 50/50 and 95/5 (by weight). A content of the polyamic acid B component less than 5% by weight is not preferred because the pre-tilt angle of the liquid crystal will become too small. If the content exceeds 50% by weight, the pre-tilt angle will not necessarily increase (see FIG. 4), and the electrical properties tend to lower. Thus, the content of the polyamic acid B component is preferably 50% by weight or less.

Specifically, the polyamic acid A having excellent electrical properties (low residual voltage and high voltage holding ratio) is a polyamic acid providing a polyimide resin giving a residual voltage of 200 mV or less and a voltage holding ratio of 97% or more, preferably 98% or more, as measured by the testing method described in the Example section of the present invention.

The large pre-tilt angle of the polyamic acid B means 3 to 15 degrees, preferably 3 to 12 degrees, and more preferably 3 to 10 degrees. The diamine component having a side chain means a diamine component having a side chain in the lateral direction relative to the main axis of the polyamic acid structure. For example, it means a diamine component having a side chain from a linking group bonded to the main axis, or the diamine component having a side chain in the lateral direction from the aromatic or alicyclic group in the main axis.

Alicyclic tetracarboxylic dianhydrides which can be used as the tetracarboxylic dianhydrides of the polyamic acid A specifically include cyclobutane tetracarboxylic dianhydride, cyclopentane tetracarboxylic dianhydride, bicyclo[2,2,2]-octo-7-ene-2,3,5,6-tetracarboxylic dianhydride, cyclohexane-1,2,5,6-tetracarboxylic dianhydride, 3,3'-bicyclohexyl-1,1',2,2'-tetracarboxylic dianhydride, 2,3,5-tricarboxycyclopentylacetic dianhydride, 5-(2,5-dioxotetrahydrofural)-3-methyl-3-cyclohexene-1,2-dicarboxylic dianhydride, 1,3,3a,4,5,9b-hexahydro-5-(tetrahydro-2,5-dioxo-3-furanyl)-naphtho[1,2,-c]-furan-1,3-dione, 3,5,6-tricarboxynorbornane-2-acetic dianhydride, and 2,3,4,5-tetrahydrofuran tetracarboxylic dianhydride, and alicyclic tetracarboxylic dianhydrides partially substituted by a lower alkyl group such as a methyl or ethyl group. Among these, preferable alicyclic tetracarboxylic dianhydrides are cyclobutane tetracarboxylic dianhydride, cyclopentane tetracarboxylic dianhydride, tricarboxycyclopentyl acetic dianhydride, and cyclohexane tetracarboxylic dianhydride.

On the other hand, although pyromellitic dianhydride is preferably used as the aromatic tetracarboxylic dianhydride of the polyamic acid A and the polyamic acid B, there may be used aromatic tetracarboxylic dianhydrides such as 3,3', 4,4'-diphenyl tetracarboxylic dianhydride, 3,3',4,4'-benzophenonetetracarboxylic dianhydride, naphthalic dianhydrides (2,3,6,7-naphthalic dianhydride etc.), 3,3',4,4'-biphenylsulphone tetracarboxylic dianhydride, 3,3',4,4'-biphenylether tetracarboxylic dianhydride, 3,3',4,4'-dimethyldiphenylsilane tetracarboxylic dianhydride, 4,4'-bis(3,4-dicarboxyphenoxy)diphenylsulfide dianhydride, 4,4'-bis(3,4-dicarboxyphenoxy)diphenylsulphone dianhydride, 4,4'-bis(3,4-dicarboxyphenoxy)diphenylpropane dianhydride, 3,3',4,4'-perfluoropyridenediphthalic dianhydride, 3,3',4,4'-biphenyltetracarboxylic dianhydride, bis(phthalic)phenylsulphine oxide dianhydride, p-phenylene-bis(triphenylphthalic)dianhydride, m-phenylene-bis(triphenylphthalic)dianhydride, bis(triphenylphthalic)-4,4'-dephenylether dianhydride, and bis(triphenylphthalic)-4,4'-diphenylmethane dianhydride. Of these compounds, those containing oxygen or sulfur atom are not preferred because they tend to degrade electrical properties, but they may be used under some conditions.

As the tetracarboxylic dianhydride component of the polyamic acid A, since the combination of an alicyclic tetracarboxylic dianhydride with an aromatic tetracarboxylic dianhydride is more effective for decreasing residual voltage than is an alicyclic tetracarboxylic dianhydride alone, in a liquid crystal element of the type whose residual voltage is regarded important, combined use of alicyclic tetracarboxlic dianhydride with an aromatic tetracarboxylic dianhydride is more preferred.

On the other hand, although the same can be said regarding the tetracarboxylic dianhydride component of the polyamic acid B, the ability of controlling alignment is regarded more important than is imparting desirable electrical properties, since the tetracarboxylic dianhydride component of the polyamic acid B is the component to effect the alignment control of the liquid crystal. In this sense, alicyclic tetracarboxylic dianhydrides have somewhat of a problem in the ability of controlling alignment, and in the case of low-temperature heating (heating at 180° C. or below) they have a problem in the stability of alignment in that alignment is disordered easily when the liquid crystal element is heated. In this regard, aromatic tetracarboxylic dianhydrides excel in the stability of alignment. Although care should be taken when a large quantity of alicyclic tetracarboxylic dianhydrides is used, no problems result from the combined use of alicyclic tetracarboxylic dianhydrides with aromatic tetracarboxylic dianhydrides to the extent where the alignment of liquid crystals is not affected.

Furthermore, for the electric-property-oriented display element, combination of alicyclic tetracarboxylic dianhydride and aromatic tetracarboxylic dianhydride can be used preferably within the extent where alignment of liquid crystal molecule is not affected badly. Even in this case, it is preferred that 50 mole % or more aromatic tetracarboxylic dianhydrides are contained in the acid component. Aromatic tetracarboxylic dianhydrides which can be used here are the compounds described above.

As the diamine component of the polyamic acid A, the aromatic diamines represented by the general formula (1) are used.

These types of diamine compound, when used in the aligning film of liquid crystals, are more favorable for the electrical properties of liquid crystal diaplay elements than are other diamine components, such as diamine components in which X is an oxygen atom, CO, $C(CF_3)_2$, or COO. Therefore, these diamine compounds are used as the main diamine components of the aligning film of the present invention, and are preferably used in particular as the main component of the diamine component of the polyamic acid A.

In general formula (1), X is preferably $CH_2$, $CH_2CH_2$, $CH_2CH_2CH_2$, or $C(CH_3)_2$, more preferably $CH_2$ or $CH_2CH_2$, and R is preferably a hydrogen atom.

Examples of these compounds include the following: When R is a hydrogen atom; 4,4'-diaminodiphenylmethane, 4,4'-diamino-1,2-diphenylethane, 4,4'-diamino-1,3-diphenylpropane, and 2,2-bis(4-aminophenyl)propane and so on. When R is a methyl radical; bis(4-amino-3-methylphenyl)methane, 1,2-bis(4-amino-3-methylphenyl)ethane, 1,3-bis(4-amino-3-methylphenyl)propane, bis(4-amino-2-methylphenyl)methane, 1,2-bis(4-amino-2-methylphenyl)ethane, and 1,3-bis(4-amino-2-methylphenyl) propane and so on.

The essential diamine component of the polyamic acid B includes at least one diamine compound having a side chain which increases the pre-tilt angle of the liquid crystal molecule, and for better electrical properties, combination with at least one of the diamine components shown in formula (1) is preferred. The examples of diamine components having side chains which increase the pre-tilt angle of the liquid crystal molecules are shown in the following formula (2).

Specifically, examples of the compounds in which z is 0, both l and m are 0, and n is 1 are as follows:
1,1-bis[4-(4-aminophenoxy)phenyl]cyclohexane,
1,1-bis[4-(4-aminophenoxy)phenyl]-4-methylcyclohexane,
1,1-bis[4-(4-aminophenoxy)phenyl]-4-ethylcyclohexane,
1,1-bis[4-(4-aminophenoxy)phenyl]-4-n-propylcyclohexane,
1,1-bis[4-(4-aminophenoxy)phenyl]-4-n-butylcyclohexane,
1,1-bis[4-(4-aminophenoxy)phenyl]-4-n-pentylcyclohexane,
1,1-bis[4-(4-aminophenoxy)phenyl]-4-n-hexylcyclohexane,
1,1-bis[4-(4-aminophenoxy)phenyl]-4-n-heptylcyclohexane,
1,1-bis[4-(4-aminophenoxy)phenyl]-4-n-octylcyclohexane,
1,1-bis[4-(4-aminophenoxy)phenyl]-4-n-nonylcyclohexane,
1,1-bis[4-(4-aminophenoxy)phenyl]-4-n-decylcyclohexane,
1,1-bis[4-(4-aminophenoxy)phenyl]-4-n-undecylcyclohexane,
1,1-bis[4-(4-aminophenoxy)phenyl]-4-n-dodecylcyclohexane,
1,1-bis[4-(4-aminophenoxy)phenyl]-4-n-tridecylcyclohexane, 1,1-bis[4-(4-aminophenoxy)phenyl]-4-n-tetradecylcyclohexane,
1,1-bis[4-(4-aminophenoxy)phenyl]-4-n-pentadecylcyclohexane, and the like.

Examples of the compounds in which l, m, and n are all 0 are as follows:
1,1-bis(4-aminophenyl)cyclohexane,
1,1-bis(4-aminophenyl)-4-methylcyclohexane,
1,1-bis(4-aminophenyl)-4-ethylcyclohexane,
1,1-bis(4-aminophenyl)-4-n-propylcyclohexane,
1,1-bis(4-aminophenyl)-4-n-butylcyclohexane,
1,1-bis(4-aminophenyl)-4-n-pentylcyclohexane,
1,1-bis(4-aminophenyl)-4-n-hexylcyclohexane,
1,1-bis(4-aminophenyl)-4-n-heptylcyclohexane,
1,1-bis(4-aminophenyl)-4-n-octylcyclohexane,
1,1-bis(4-aminophenyl)-4-n-nonylcyclohexane,
1,1-bis(4-aminophenyl)-4-n-dodecylcyclohexane,
1,1-bis(4-aminophenyl)-4-n-tridecylcyclohexane,
1,1-bis(4-aminophenyl)-4-n-tetradecylcyclohexane,
1,1-bis(4-aminophenyl)-4-n-pentadecylcyclohexane, and the like.

Examples of the compounds in which l is 1, A is a cyclohexyl group, and both m and n are 0 are as follows:
1,1-bis(4-aminophenyl)-4-cyclohexylcyclohexane,
1,1-bis(4-aminophenyl)-4-(4-methyl-trans-cyclohexyl)cyclohexane,
1,1-bis(4-aminophenyl)-4-(4-ethyl-trans-cyclohexyl)cyclohexane,
1,1-bis(4-aminophenyl)-4-(4-n-propyl-trans-cyclohexyl)cyclohexane,
1,1-bis(4-aminophenyl)-4-(4-n-butyl-trans-cyclohexyl)cyclohexane,
1,1-bis(4-aminophenyl)-4-(4-n-pentyl-trans-cyclohexyl)cyclohexane,
1,1-bis(4-aminophenyl)-4-(4-n-hexyl-trans-cyclohexyl)cyclohexane,
1,1-bis(4-aminophenyl)-4-(4-n-heptyl-trans-cyclohexyl)cyclohexane,
1,1-bis(4-aminophenyl)-4-(4-n-octyl-trans-cyclohexyl)cyclohexane,
1,1-bis(4-aminophenyl)-4-(4-n-nonyl-trans-cyclohexyl)cyclohexane,
1,1-bis(4-aminophenyl)-4-(4-n-decyl-trans-cyclohexyl)cyclohexane,
1,1-bis(4-aminophenyl)-4-(4-n-undecyl-trans-cyclohexyl)cyclohexane,
1,1-bis(4-aminophenyl)-4-(4-n-docecyl-trans-cyclohexyl)cyclohexane,
1,1-bis(4-aminophenyl)-4-(4-n-tridecyl-trans-cyclohexyl)cyclohexane,
1,1-bis(4-aminophenyl)-4-(4-n-tetradecyl-trans-cyclohexyl)cyclohexane,
1,1-bis(4-aminophenyl)-4-(4-n-pentadecyl-trans-cyclohexyl)cyclohexane, and the like.

Examples of the compounds in which l is 1, A is a cyclohexyl group, m is 1, n is 1, Y is CH2 and Z is an oxygen atom are as follows:
1,1-bis[4-(4-aminophenoxy)phenyl]-4-(cyclohexylmethyl)cyclohexane,
1,1-bis[4-(4-aminophenoxy)phenyl]-4-[(4-methylcyclohexyl)methyl]cyclohexane,
1,1-bis[4-(4-aminophenoxy)phenyl]-4-[(4-ethylcyclohexyl)methyl]cyclohexane,
1,1-bis[4-(4-aminophenoxy)phenyl]-4-[(4-propylcyclohexyl)methyl]cyclohexane,
1,1-bis[4-(4-aminophenoxy)phenyl]-4-[(4-butylcyclohexyl)methyl]cyclohexane,
1,1-bis[4-(4-aminophenoxy)phenyl]-4-[(4-pentylcyclohexyl)methyl]cyclohexane,
1,1-bis[4-(4-aminophenoxy)phenyl]-4-[(4-hexylcyclohexyl)methyl]cyclohexane,
1,1-bis[4-(4-aminophenoxy)phenyl]-4-[(4-heptylcyclohexyl)methyl]cyclohexane,
1,1-bis[4-(4-aminophenoxy)phenyl]-4-[(4-octylcyclohexyl)methyl]cyclohexane, and the like.

Examples of the compounds in which both l and m are 1, A is a cyclohexyl group, Y is $CH_2$, and n is 0 are as follows:
1,1-bis(4-aminophenyl)-4-(cyclohexylmethyl)cyclohexane,
1,1-bis(4-aminophenyl)-4-[(4-methylcyclohexyl)methyl]cyclohexane,
1,1-bis(4-aminophenyl)-4-[(4-ethylcyclohexyl)methyl]cyclohexane,
1,1-bis(4-aminophenyl)-4-[(4-propylcyclohexyl)methyl]cyclohexane,
1,1-bis(4-aminophenyl)-4-[(4-butylcyclohexyl)methyl]cyclohexane,
1,1-bis(4-aminophenyl)-4-[(4-pentylcyclohexyl)methyl]cyclohexane,
1,1-bis(4-aminophenyl)-4-[(4-hexylcyclohexyl)methyl]cyclohexane,
1,1-bis(4-aminophenyl)-4-[(4-heptylcyclohexyl)methyl]cyclohexane,
1,1-bis(4-aminophenyl)-4-[(4-octylcyclohexyl)methyl]cyclohexane, and the like.

Examples of the compounds in which l is 1, A is a phenyl group, Y is $CH_2$, m is 1, n is 1, and Z is an oxygen atom are as follows:
1,1-bis[4-(4-aminophenoxy)phenyl]-4-(phenylmethyl)cyclohexane,
1,1-bis[4-(4-aminophenoxy)phenyl]-4-[(4-methylphenyl)methyl]cyclohexane,
1,1-bis[4-(4-aminophenoxy)phenyl]-4-[(4-ethylphenyl)methyl]cyclohexane,
1,1-bis[4-(4-aminophenoxy)phenyl]-4-[(4-propylphenyl)methyl]cyclohexane,
1,1-bis[4-(4-aminophenoxy)phenyl]-4-[(4-butylphenyl)methyl]cyclohexane,
1,1-bis[4-(4-aminophenoxy)phenyl]-4-[(4-pentylphenyl)methyl]cyclohexane,
1,1-bis[4-(4-aminophenoxy)phenyl]-4-[(4-hexylphenyl)methyl]cyclohexane,
1,1-bis[4-(4-aminophenoxy)phenyl]-4-[(4-heptylphenyl)methyl]cyclohexane,
1,1-bis[4-(4-aminophenoxy)phenyl]-4-[(4-octylphenyl)methyl]cyclohexane, and the like.

Examples of the compounds in which l is 1, A is a phenyl group, m is 1, Y is $CH_2$, and n is 0 are as follows:
1,1-bis(4-aminophenyl)-4-(phenylmethyl)cyclohexane,
1,1-bis(4-aminophenyl)-4-[(4-methylphenyl)methyl]cyclohexane,
1,1-bis(4-aminophenyl)-4-[(4-ethylphenyl)methyl]cyclohexane,
1,1-bis(4-aminophenyl)-4-[(4-propylphenyl)methyl]cyclohexane,
1,1-bis(4-aminophenyl)-4-[(4-butylphenyl)methyl]cyclohexane,
1,1-bis(4-aminophenyl)-4-[(4-pentylphenyl)methyl]cyclohexane,
1,1-bis(4-aminophenyl)-4-[(4-hexylphenyl)methyl]cyclohexane,
1,1-bis(4-aminophenyl)-4-[(4-heptylphenyl)methyl]cyclohexane,
1,1-bis(4-aminophenyl)-4-[(4-octylphenyl)methyl]cyclohexane, and the like.

Examples of the compounds in which l is 1, A is a phenyl group, Y is $CH_2$, m is 1, n is 1, and Z is $CH_2$ are as follows:
1,1-bis(4-((4-aminophenyl)methyl)phenyl)-4-(phenylmethyl)cyclohexane,
1,1-bis(4-((4-aminophenyl)methyl)phenyl)-4-[(4-methylphenyl)methyl]cyclohexane,
1,1-bis(4-((4-aminophenyl)methyl)phenyl)-4-[(4-ethylphenyl)methyl]cyclohexane,
1,1-bis(4-((4-aminophenyl)methyl)phenyl)-4-[(4-propylphenyl)methyl]cyclohexane,
1,1-bis(4-((4-aminophenyl)methyl)phenyl)-4-[(4-butylphenyl)methyl]cyclohexane,
1,1-bis(4-((4-aminophenyl)methyl)phenyl)-4-[(4-pentylphenyl)methyl]cyclohexane
1,1-bis(4-((4-aminophenyl)methyl)phenyl)-4-[(4-hexylphenyl)methyl]cyclohexane,
1,1-bis(4-((4-aminophenyl)methyl)phenyl)-4-[(4-heptylphenyl)methyl]cyclohexane,
1,1-bis(4-((4-aminophenyl)methyl)phenyl)-4-[(4-octylphenyl)methyl]cyclohexane, and the like.

Examples of the compounds in which both l and m are 0, n is 1, and Z is $CH_2$ are as follows:
1,1-bis(4-((4-aminophenyl)methyl)phenyl)cyclohexane,
1,1-bis(4-((4-aminophenyl)methyl)phenyl)-4-methylcyclohexane,
1,1-bis(4-((4-aminophenyl)methyl)phenyl)-4-ethylcyclohexane,
1,1-bis(4-((4-aminophenyl)methyl)phenyl)-4-propylcyclohexane,
1,1-bis(4-((4-aminophenyl)methyl)phenyl)-4-butylcyclohexane,
1,1-bis(4-((4-aminophenyl)methyl)phenyl)-4-pentylcyclohexane,
1,1-bis(4-((4-aminophenyl)methyl)phenyl)-4-hexylcyclohexane,
1,1-bis(4-((4-aminophenyl)methyl)phenyl)-4-heptylcyclohexane,
1,1-bis(4-((4-aminophenyl)methyl)phenyl)-4-octylcyclohexane, and the like.

Compounds not listed above but represented by formula (2) are included in the present invention.

Of these compounds, for example, when both m and l are 0, when R is a hydrogen atom, or when the length of the alkyl group is short, since the rising slope of the pre-tilt angle versus the quantity of the polyamic acid B is gentle and a relatively large quantity of the polyamic acid B is required before equilibrium is reached, it is preferred that the length of the alkyl group is not short. When two or more rings are present in the side chain, good results are obtained even if R is a hydrogen atom. In the present invention, the use of a large quantity of the polyamic acid B relative to that of the polyamic acid A is not preferred.

As diamine compounds which can increase the pre-tilt angle, there can be also used compounds represented by formula (3), aromatic diamine compounds whose hydrogen atoms are substituted by alkyl groups or mesogen groups (liquid crystal groups), or diamine components which increase the pre-tilt angle of the liquid crystal molecule. For these components, a large variety of diamine components have already been disclosed by patents and the like.

Examples of diamine components which can be used in the present invention having side chains increasing the pre-tilt angle include the following diamine compounds, but are not limited to these examples, and other diamine compounds increasing the pre-tilt angle can be used so long as the advantages of the present invention are not affected.

Also in this case, if the number of carbon atoms in R1 and R2 is small, the rising slope of the pre-tilt angle versus the quantity of the polyamic acid B is gentle. It is preferred, therefore, that at least one of R1 and R2 has three or more carbon atoms.

Specific examples of these compounds include the following compounds, but other compounds represented by formula (3) are included in these compounds.

Examples of compounds in which X1 is an oxygen atom and n1 is 1 are as follows:
2,2-bis-[4-(aminophenoxy)phenyl]propane,
2,2-bis-[4-(aminophenoxy)phenyl]butane,
2,2-bis-[4-(aminophenoxy)phenyl]pentane,
2,2-bis-[4-(aminophenoxy)phenyl]hexane,
2,2-bis-[4-(aminophenoxy)phenyl]heptane,
2,2-bis-[4-(aminophenoxy)phenyl]octane,
2,2-bis-[4-(aminophenoxy)phenyl]noname,
2,2-bis-[4-(aminophenoxy)phenyl]decane,
2,2-bis-[4-(aminophenoxy)phenyl]undecane,
2,2-bis-[4-(aminophenoxy)phenyl]dodecane,
2,2-bis-[4-(aminophenoxy)phenyl]tridecane,
2,2-bis-[4-(aminophenoxy)phenyl]tetradecane,
2,2-bis-[4-(aminophenoxy)phenyl]pentadecane,
2,2-bis-[4-(aminophenoxy)phenyl]hexadecane,
2,2-bis-[4-(aminophenoxy)phenyl]heptadecane,
2,2-bis-[4-(aminophenoxy)phenyl]octadecane,
2,2-bis-[4-(aminophenoxy)phenyl]nonadecane, and the like.

Examples of compounds in which X1 is $CH_2$ and n1 is 1 are as follows:
2,2-bis-(4-((4-aminophenyl)methyl)phenyl)propane,
2,2-bis-(4-((4-aminophenyl)methyl)phenyl)butane,
2,2-bis-(4-((4-aminophenyl)methyl)phenyl)pentane,
2,2-bis-(4-((4-aminophenyl)methyl)phenyl)hexane,
2,2-bis-(4-((4-aminophenyl)methyl)phenyl)heptane,
2,2-bis-(4-((4-aminophenyl)methyl)phenyl)octane,
2,2-bis-(4-((4-aminophenyl)methyl)phenyl)nonane,
2,2-bis-(4-((4-aminophenyl)methyl)phenyl)decane,
2,2-bis-(4-((4-aminophenyl)methyl)phenyl)undecane,
2,2-bis-(4-((4-aminophenyl)methyl)phenyl)dodecane,
2,2-bis-(4-((4-aminophenyl)methyl)phenyl)tridecane,
2,2-bis-(4-((4-aminophenyl)methyl)phenyl)tetradecane,
2,2-bis-(4-((4-aminophenyl)methyl)phenyl)pentadecane,
2,2-bis-(4-((4-aminophenyl)methyl)phenyl)hexadecane,
2,2-bis-(4-((4-aminophenyl)methyl)phenyl)heptadecane,
2,2-bis-(4-((4-aminophenyl)methyl)phenyl)octadecane,
2,2-bis-(4-((4-aminophenyl)methyl)phenyl)nonadecane,
2,2-bis-(4-((4-aminophenyl)methyl)phenyl)perfluoropropane,
2,2-bis-(4-((4-aminophenyl)methyl)phenyl)perfluorobutane,
2,2-bis-(4-((4-aminophenyl)methyl)phenyl)perfluoropentane,
2,2-bis-(4-((4-amiophenyl)methyl)phenyl)perfluorohexane,
2,2-bis-(4-((4-aminophenyl)methyl)phenyl)perfluoroheptane,
2,2-bis-(4-((4-aminophenyl)methyl)phenyl)perfluorooctane,
2,2-bis-(4-((4-aminophenyl)methyl)phenyl)perfluorononane,
2,2-bis-(4-((4-aminophenyl)methyl)phenyl)perfluorodecane,
2,2-bis-(4-((4-aminophenyl)methyl)phenyl)perfluoroundecane,
2,2-bis-(4-((4-aminophenyl)methyl)phenyl)perfluorododecane,
2,2-bis-(4-((4-aminophenyl)methyl)phenyl)perfluorotridecane,
2,2-bis-(4-((4-aminophenyl)methyl)phenyl)perfluorotetradecane,
2,2-bis-(4-((4-aminophenyl)methyl)phenyl)perfluoropentadecane, 2,2-bis-(4-((4-aminophenyl)methyl)phenyl) perfluorohexadecane,
2,2-bis-(4-((4-aminophenyl)methyl)phenyl) perfluoroheptadecane,
2,2-bis-(4-((4-aminophenyl)methyl)phenyl) perfluorooctadecane, and
2,2-bis-(4-((4-aminophenyl)methyl)phenyl) perfluorononadecane.

Other than the above-mentioned compounds, examples of diamino compounds of the form of phenylene diamine having a side chain are as follows:
1,4-diamino-3-((4-alkylcyclohexyl)cyclohexyloxy)benzene,
1,4-diamino-3-((4-alkylphenyl)cyclohexyloxy)benzene,
1,4-diamino-3-((4-alkylterphenyl)oxy)benzene,
1,3-diamino-5-perfluoroalkylbenzene,
1,3-diamino-5-(2-trifluoromethyl-3,3,3-trifluoro)propyl)benzene,
4-(4-trifluoromethylphenoxy)-2,3-diaminobenzene,
4-(4-fluorophenoxy)-1,3-diaminobenzene,
1,3-diamino-4-(4-alcoxy biphenyloxy)benzene,
1,3-diamino-4-(4-trifluoromethoxy biphenyloxy)benzene,
1,4-diamino-(2-alkyl)benzene,
1,4-diamino-(2,5-dialkyl)benzene,
2-alkyloxy-1,4-diaminobenzene,
and other diamine compounds having a phenylene diamine backbone with a steroid-based side chain and the like.

Even in the case of phenylene diamine compounds, the group constituting the side chain having 3 or more carbon atoms is more preferable than that having 1 or 2 carbon atoms, because such a group increases the pre-tilt angle. Since substituted groups containing oxygen or sulfur atom are not preferable in terms of electrical properties, substituted groups not containing such groups are preferable, as in formulas (2) and (3). In the case of the polyamic acid B of the present invention, the electrical properties are little affected because the content is relatively small.

In addition to these tetracarboxylic dianhydrides and diamines, monoamino compounds or carboxylic anhydride compounds which constitute the reacting end groups of the polyamic acids may be used in combination. In order to enhance the adhesion to the substrate, aminosilicon compounds or diaminosilicon compounds may be introduced.

The use of these diamino compounds should be limited within the range in which practical adhesion is obtained, because if these diamino compounds are used in a large quantity, the alignment of the liquid crystal molecules becomes poor.

Aminosilicon compounds include p-aminophenyl trimethoxysilane, p-aminophenyl triethoxysilane, m-aminophenyl trimethoxysilane, m-aminophenyl triethoxysilane, aminopropyl trimethoxysilane, and aminopropyl triethoxysilane.

Diaminosilicon compounds include 1,3-bis(3-aminopropyl)-1,1,3,3-tetraphenyl siloxane, 1,3-bis(3-aminopropyl)-1,1,3,3-tetramethyl disiloxane, and 1,3-bis(4-aminobutyl)-1,1,3,3-tetramethyl disiloxane.

In diamines used in the polyamic acid B, the ratio of the diamine represented by formula (1) to the diamine increasing the pre-tilt angle is determined according to the type of the diamine increasing the pre-tilt angle (in general, diamine compounds having long side chains give large pre-tilt angles), and the required pre-tilt angle. Generally, the mole ratio is between 0/100 and 97/3, preferably between 0/100 and 92/8. The use of the diamine components inducing the pre-tilt angle should be limited to the minimum quantity to obtain a required pre-tilt angle, especially when electrical properties are regarded important particularly, because if the compounds contain oxygen or sulfur atom, the electrical properties of the liquid crystal are affected as described above. Use of diamines that increase the pre-tilt angle to a greater extent can reduce the quantity of such diamines.

Although the ratio A/B, the quantity of the polyamic acid A to the polyamic acid B, may be within the range between 50/50 and 95/5 (by weight), the process dependence of the pre-tilt angle increases if the content of the polyamic acid B is low. Therefore, the quantity of the polyamic acid B component is preferably 5% by weight or more when the process dependence of the pre-tilt angle is taken into account. When the balance of the process dependence of the pre-tilt angle and electrical properties is considered, the quantity of the polyamic acid B is more preferably between 6 and 30% by weight.

Typically, the polyamic acids are dissolved in solvents, and the solution is used as a coating solution. Although the polymer content (the total of the polyamic acid A and the polyamic acid B) in the coating solution is 0.1 to 40% by weight, the optimum content of the polymer component differs depending on the method for coating the alignment material coating solution to a substrate, and cannot be specified to a particular content. For the spinner method or the printing method normally used, the content of the polymer component is preferably 0.5 to 10% by weight. If the polymer content is less than 0.5% by weight, the thickness of the aligning film becomes too thin, and if the content exceeds 10% by weight, the thickness becomes too thick. The polymer content of 40% by weight or more is often not preferable because the viscosity is too high, and the solvent cannot be mixed well when the polymer is diluted.

Polymers such as other polyamic acids, polyamic esters, soluble polyimides, and polyamideimides may be used in combination with the polyamic acid A and the polyamic acid B unless the advantages of the present invention are impaired. Furthermore, a liquid crystal alignment material containing more than one polyamic acid is used in the present invention. This alignment material is imidized by heating. (Although the alignment material is not required to be fully imidized, the imidization percentage after heating is preferably 40% or more.) Therefore, the same advantages are expected if a soluble polyimide A and a soluble polyimide B are used in place of the polyamic acids of the present invention. That is, the polyamic acid component of the present invention may comprise both polyamic acids, a soluble polyimide for one and a polyamic acid for the other, or both soluble polyimides.

The solvent used for the coating solution may be any solvent used for polyamic acids or soluble polyimides. Specifically, a non-protonic polar organic solvent that is good solvent for polyamic acids such as (N-methyl-2-pyrrolidone, dimethylimidazolidinone, N-methylcaprolactam, N-methylpropionamide, N,N-dimethylacetamide, dimethyl sulfoxide, N,N-dimethylformamide, N,N-diethylformamide, N,N-diethylacetamide, γ-butyrolactone, etc.) may be used together with other low-surface-tension solvent systems (alkyl lactates, 3-methyl-3-methoxy butanol, tetralin, isophorone, ethylene glycol monoalkyl ethers (e.g. ethylene glycol monobutyl ether), diethylene glycol monoalkyl ethers (e.g. diethylene glycol monoethyl ether), ethylene glycol monoalkyl or phenyl acetate, triethylene glycol monoalkyl ethers, propylene glycol monoalkyl ethers (e.g. propylene glycol monobutyl ether), dialkyl malonates (e.g. diethyl malonate), ethylene glycol monoalkyl acetates, diethylene glycol monoalkyl acetates, propylene glycol monoalkyl acetates, dipropylene glycol monoalkyl acetates) for improving the coating properties or other purposes. These solvents are often poor solvents compared with the previously mentioned solvents. For improvement of coating properties, combined use with these solvents is preferred.

As the method for applying the coating solution dissolved in these solvents to a substrate forming a liquid crystal aligning film, there may be used any method normally employed. For example, the spinner method, the printing method, the dipping method, or the dropping method may be used for the coating of such coating solution. Also, in heat treatment required for drying, or dehydration or ring forming reactions, the same method as that for the conventional polyamic acids may be used. For example, heat treatment may be performed through the use of an oven, hot plate, or infrared furnace. After coating of the coating solution, preferably the solvent is evaporated at a relatively low temperature and heat treatment is performed at a temperature between 150 and 300° C. In the coating solution of the present invention, there may be added a catalyst for promoting imidization, as well as a surface active agent for improving the coating properties, and an anti-static agent for preventing generation of static electricity. Furthermore, a silane coupling agent or a titanium-based coupling agent may be added for improving adhesion to the substrate.

The present invention addresses an aligning film favorably used in TFTs, and the pre-tilt angle may be controlled optionally by changing the type and quantity of the diamine component having a side chain so as to increase the pre-tilt angle with the polyamic acid B used. The element of this invention can be used for STN mode, or ferroelectric or anti-ferroelectric liquid crystal display elements. In the region of a small pre-tilt angle of the present invention, the films can also be used for IPS mode liquid crystal display elements.

The liquid crystal compositions preferably used for TFT display elements using the aligning film of the present invention are those comprising fluorine-containing liquid crystalline compounds shown in the following general formulas (4), (5), and (6), and preferably consist mainly of these components. These compositions may comprise only one of compounds shown in the formulas (4), (5), and (6), or may comprise at least one of these compounds. However, use of compounds containing ether or ester groups in these compounds is not preferable from the viewpoint of electrical properties.

Specific compounds are shown below; however, since all the compounds represented by formulas (4), (5), and (6) cannot be shown, only examples of these compounds are shown. Therefore, compounds not shown here but represented by formulas (4), (5), and (6) are included in the present invention.

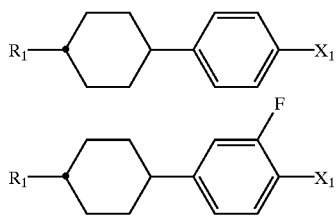

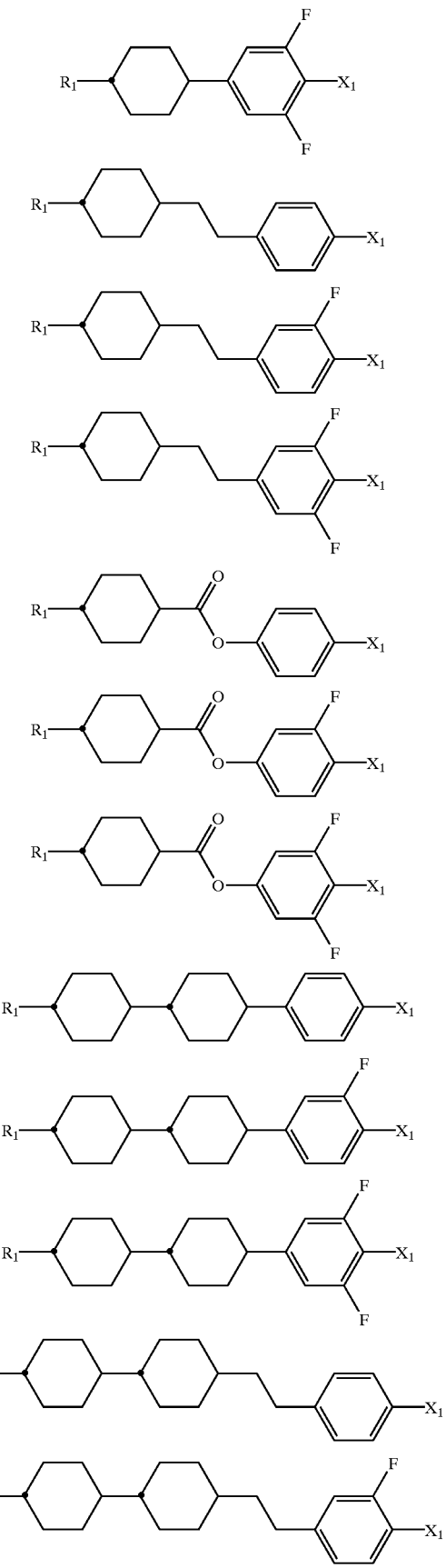

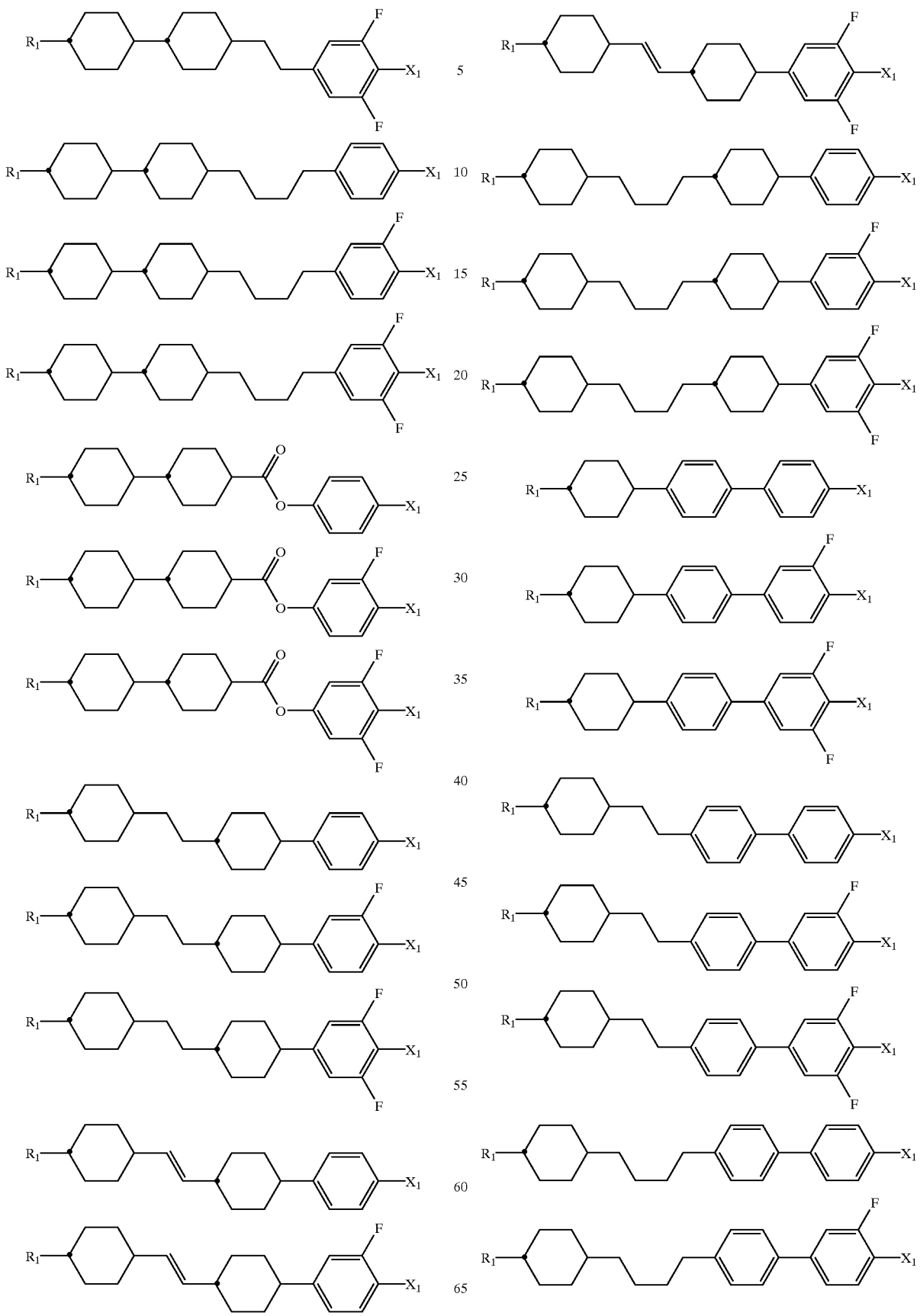

-continued
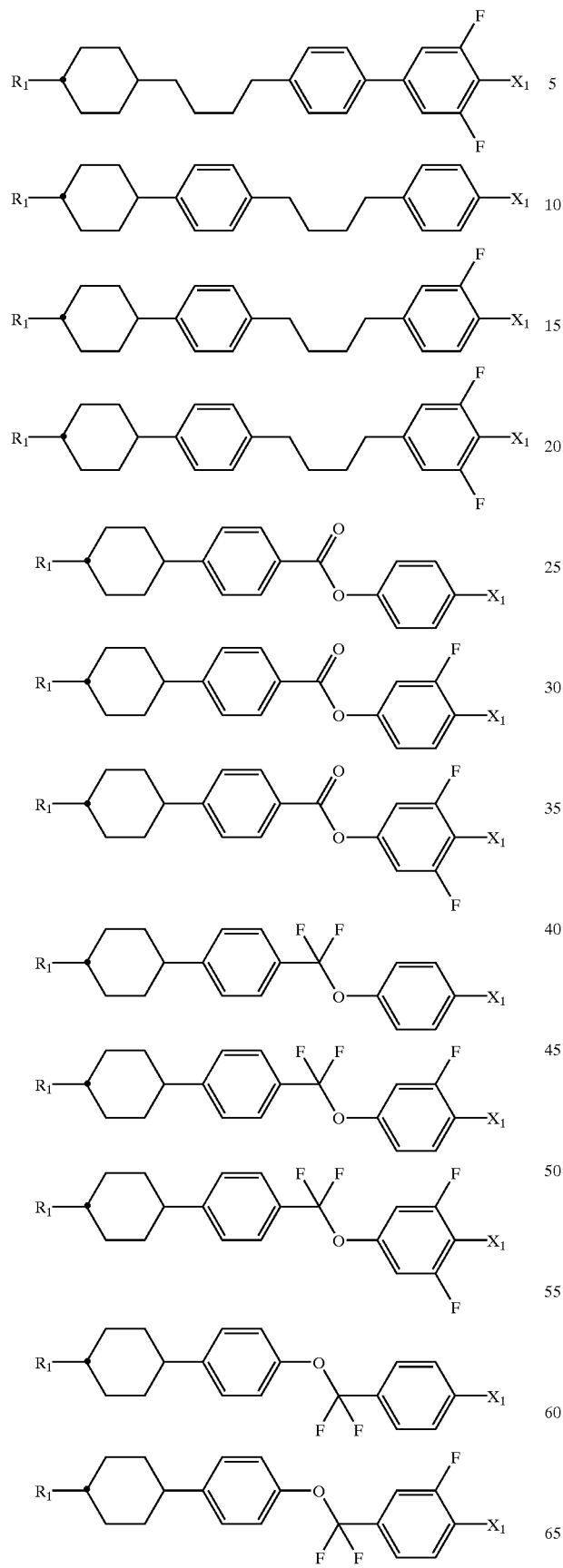
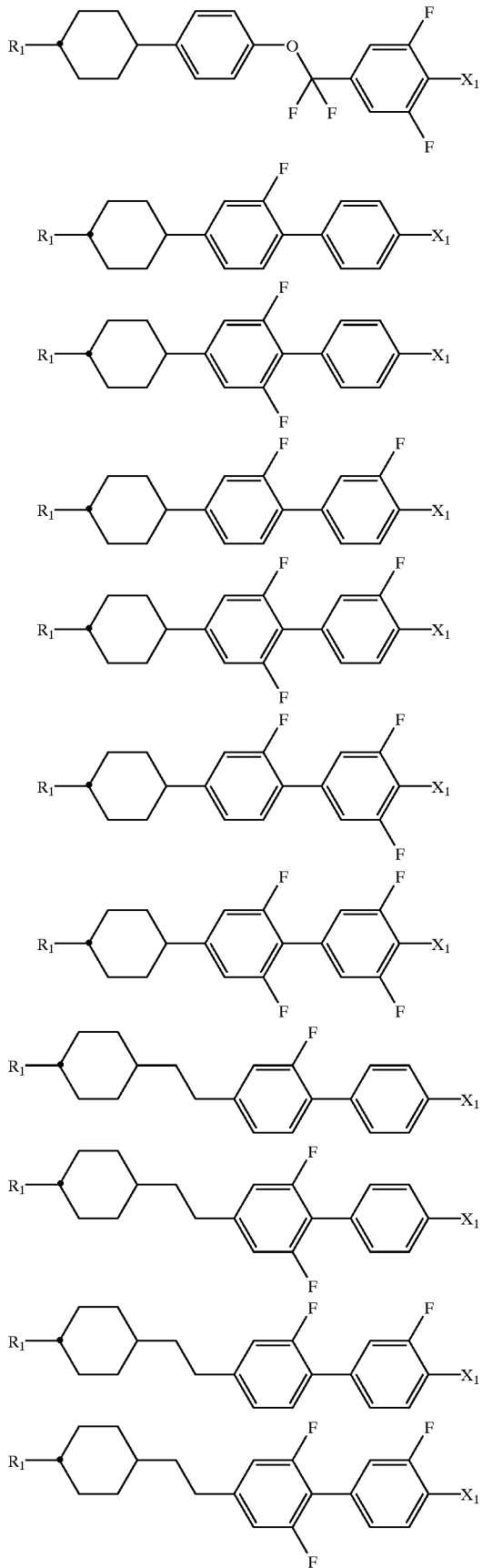

-continued
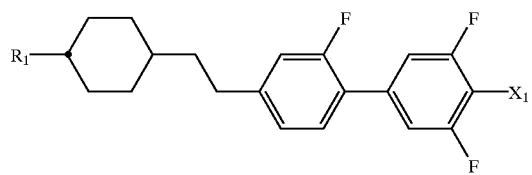
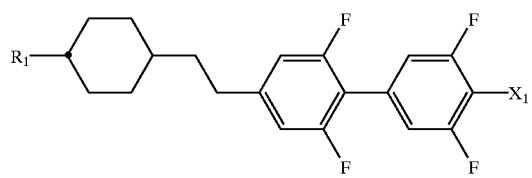
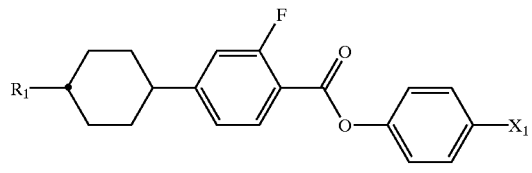
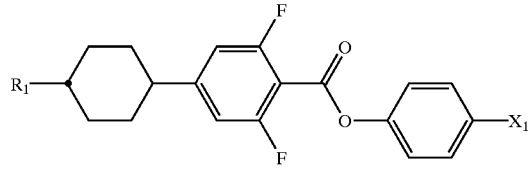
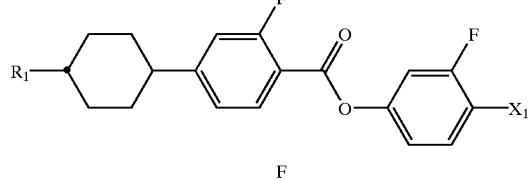
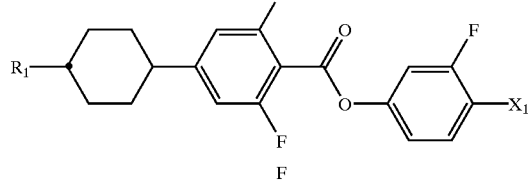
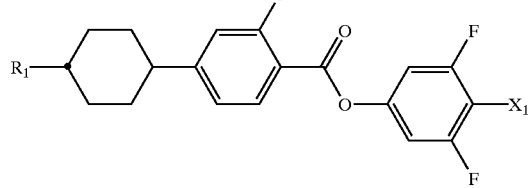
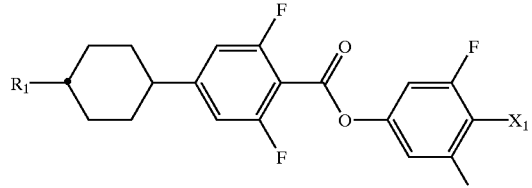
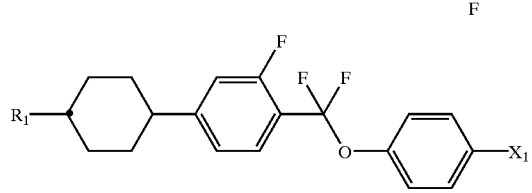
-continued
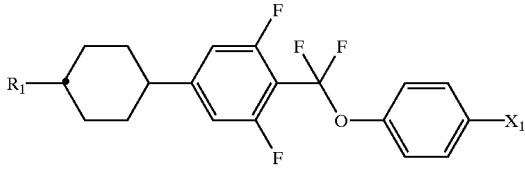
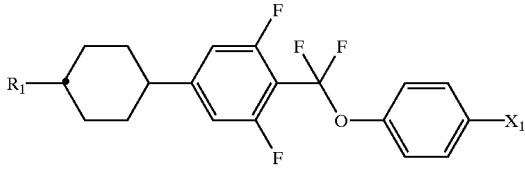
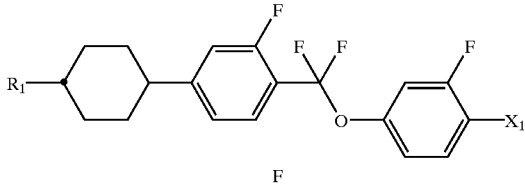
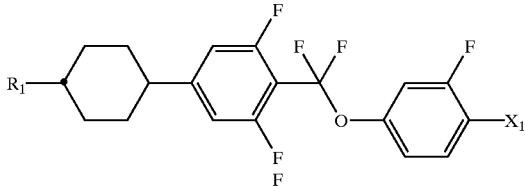
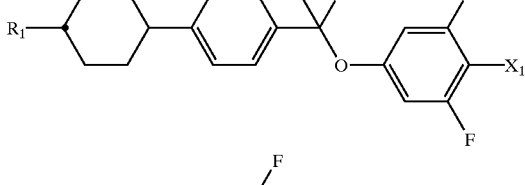
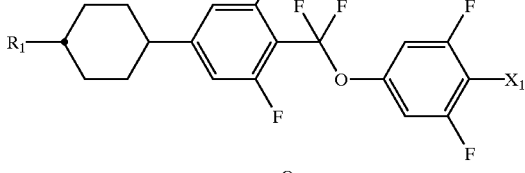
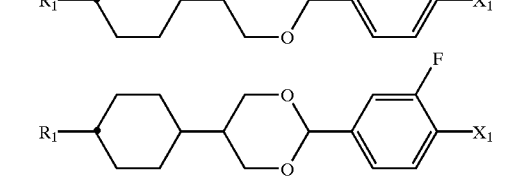
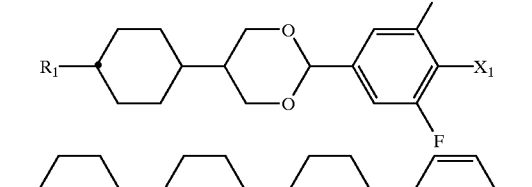
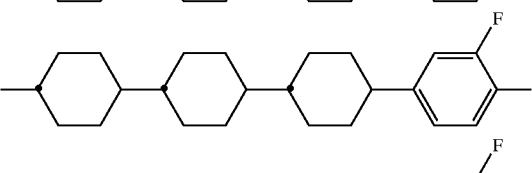
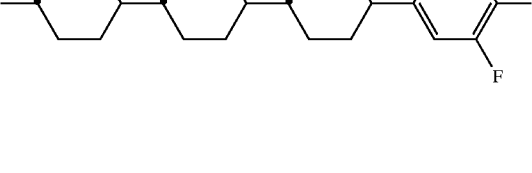

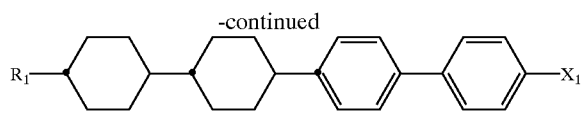
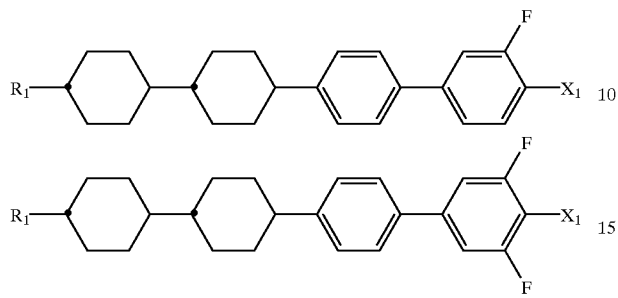
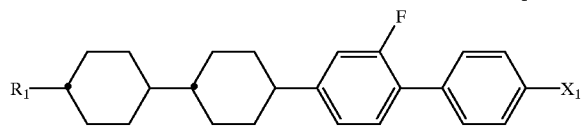
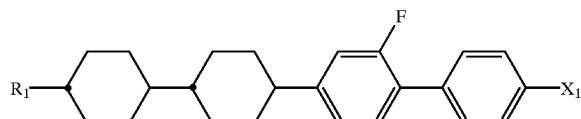
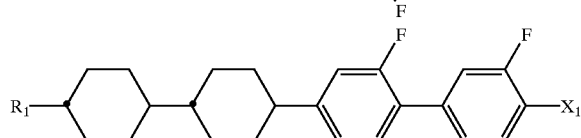
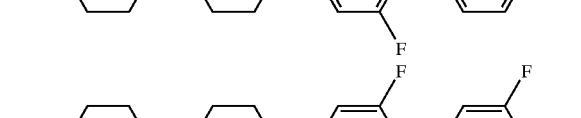
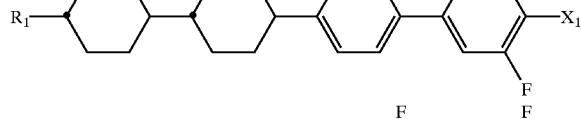
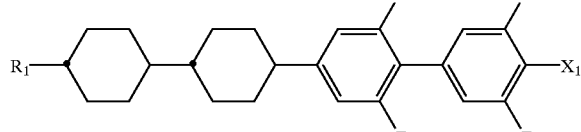
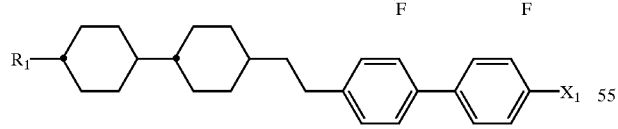
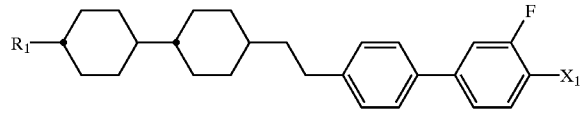
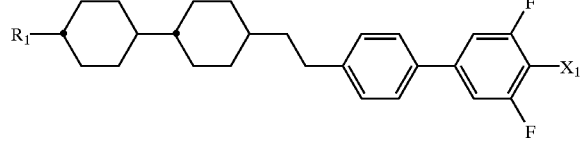

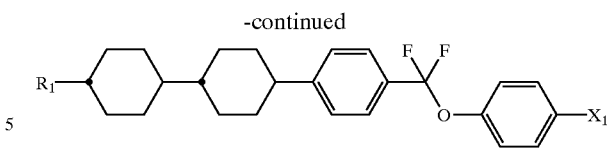
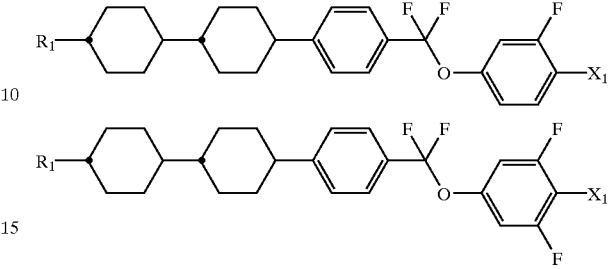
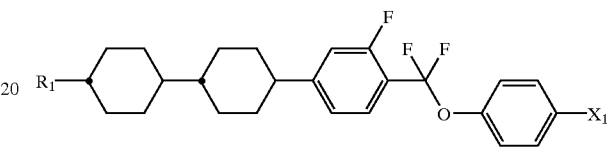
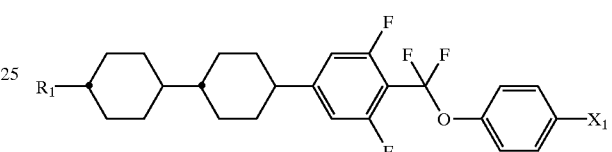
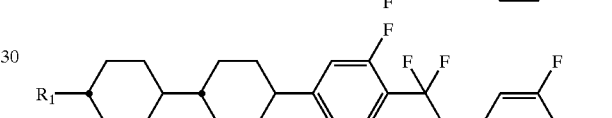
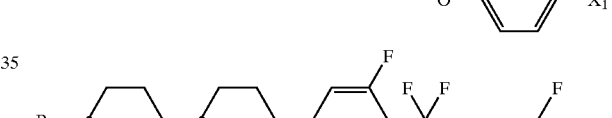
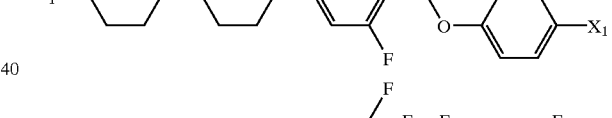
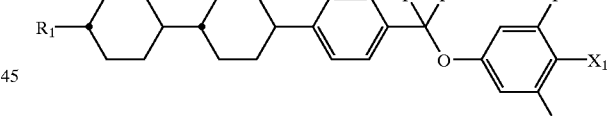
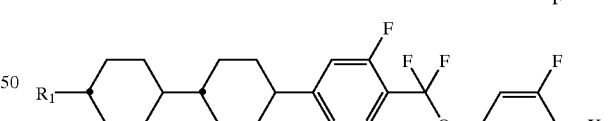

To the above liquid crystalline compounds (although some compounds do not exhibit properties as a liquid crystal, they are effective for lowering viscosity when combined with liquid crystalline compounds), the following compounds having small dielectric anisotropy values may be added. In formula (22), each of R2 and R3 represents an alkyl group having 1 to 8 carbon atoms; R4 represents an alkyl group having 1 to 8 carbon atoms, a fluorine atom, or a chlorine atom; and each of a and b represents 0 or 1.

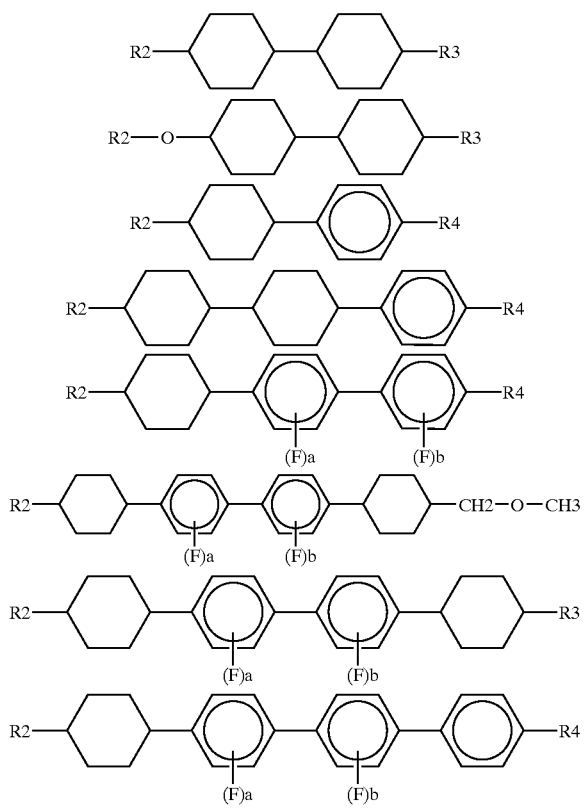

EXAMPLES

Synthesis of Polyamic Acids A, B, and C

Before examples of the synthesis of various polyamic acids corresponding to the polyamic acids A, B, and C are described, the names and the abbreviations of tetracarboxylic dianhydrides, diamines, and solvents will be shown below. The abbreviations will be used in the following description.

Tetracarboxylic Dianhydrides

| | |
|---|---|
| Pyromellitic dianhydride: | PMDA |
| Cyclobutane tetracarboxylic dianhydride | CBDA |
| (Diamino compounds) | |
| 4,4'-diaminophenylmethane: | DPM |
| 4,4'-diaminophenylethane: | DPEt |
| 4,4'-diaminophenylpropane: | DPP |
| 4,4'-diaminophenylether: | DPEr |
| Bis[(4,4'-diaminophenoxy)phenyl]propane: | DPPP |
| 1,1-bis[4-(4-aminophenyl)methyl)phenyl]-4-n-butylcyclohexane: | PMBCh |
| 1,1-bis(4-aminophenoxy)phenyl-4-(4-pentylcyclohexyl)cyclohexane: | PPPCC |

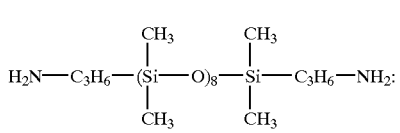

FM3307

-continued (Solvent components)

| | |
|---|---|
| N-methyl-2-pyrrolidone: | NMP |
| Butyl cellosolve: | BC |

Synthesis of Polyamic Acid A1

In a 200-ml four-neck flask having inlets for inserting a thermometer, for inserting a stirrer, for feeding the materials and for introducing nitrogen gas, 2.5136 g of DPM was dissolved in 43.69 g of dehydrated NMP with stirring under the stream of dry nitrogen gas. While the temperature of the reaction system was maintained between 5° C. and 70° C., 2.4864 g of CBDA was added to allow to react for 5 to 30 hours, then 55.49 g of BC was added to obtain the polyamic acid A1 having a polymer content of 5% by weight. When the temperature is elevated due to the heat of reaction of the materials, the reaction temperature was maintained at 70° C. or below and the reaction was continued. In the embodiment of the present invention, the viscosity of the polyamic acid was checked during the reaction, and when the viscosity after the addition of BC reached 35 to 40 mPa·s (E-type viscometer, at 25° C.), the reaction was stopped, and the resultant polyamic acid A1 was stored at low temperature.

Synthesis of Polyamic Acids A2 to A9 and B1 to B4

Polyamic acids A2 to A9 and B1 to B4 were synthesized in the same manner as for the polyamic acid A1. The weights of materials used are shown in Tables 1 and 3. The same types and quantities of solvents were used as in the synthesis of the polyamic acid A1. That is, the initial polyamic acid was synthesized by use of NMP alone, then BC was added to adjust the final polyamic acid content to be 5% by weight. In Tables 2 and 4, the mole percentage of each material is shown.

TABLE 1

Weight of materials used in Synthetic Example A

| | Weights of material components (g) | | | | | |
|---|---|---|---|---|---|---|
| | Acid dianhydride | | Diamine component | | | |
| Synthetic Example | PMDA | CBDA | DPM | DPP | DPPP | DPEr |
| A1 | | 2.4864 | 2.5136 | | | |
| A2 | 0.8159 | 1.7118 | 2.4723 | | | |
| A3 | 1.0820 | 1.4593 | 2.4588 | | | |
| A4 | 1.3451 | 1.2095 | 2.4454 | | | |
| A5 | 1.8630 | 0.7179 | 2.4192 | | | |
| A6 | 1.2581 | 1.1312 | | 2.6107 | | |
| A7 | 2.6192 | | 2.3808 | | | |
| A8 | 0.8829 | 0.7938 | | | 3.3233 | |
| A9 | 1.3870 | 1.2036 | | | | 2.4577 |

TABLE 2

Mole ratio of materials used in Synthetic Example A

| | Weights of material components (mole %) | | | | | |
|---|---|---|---|---|---|---|
| | Acid dianhydride | | Diamine component | | | |
| Synthetic Example | PMDA | CBDA | DPM | DPP | DPPP | DPEr |
| A1 | | 50 | 50 | | | |
| A2 | 15 | 35 | 50 | | | |
| A3 | 20 | 30 | 50 | | | |
| A4 | 25 | 25 | 50 | | | |
| A5 | 35 | 15 | 50 | | | |
| A6 | 25 | 25 | | 50 | | |
| A7 | 50 | | 50 | | | |
| A8 | 25 | 25 | | | 50 | |
| A9 | 25 | 25 | | | | 50 |

TABLE 3

Weights of materials used in Synthetic Example B

| | Weights of material components (g) | | | | | | |
|---|---|---|---|---|---|---|---|
| | Acid dianhydride | | Diamine component | | | | |
| Synthetic Example | PMDA | CBDA | DPM | DPEt | PMBCh | PPPCC | FM3307 |
| B1 | 1.8946 | | | 0.9220 | 2.1834 | | |
| B2 | 1.5129 | | | | 3.4871 | | |
| B3 | 0.0770 | 0.8793 | 0.8889 | | 2.2539 | | |
| B4 | 0.6474 | 0.5821 | | 1.2166 | | 1.8603 | |
| B5 | 1.9231 | | | | 1.4922 | | 2.2783 |

TABLE 4

Mole ratios of materials used in Synthetic Example B

| | Weights of material components (mole %) | | | | | | |
|---|---|---|---|---|---|---|---|
| | Acid dianhydride | | Diamine component | | | | |
| Synthetic Example | PMDA | CBDA | DPM | DPEt | PMBCh | PPPCC | FM3307 |
| B1 | 50 | | | 25 | 25 | | |
| B2 | 50 | | | | 50 | | |
| B3 | 25 | 25 | 25 | | 25 | | |
| B4 | 25 | 25 | | 32.5 | | 17.5 | |
| B5 | 50 | | | | 25 | | 25 |

Synthesis of Copolyamic Acids C

The examples of the synthesis of copolyamic acids C1 to C4 are described below.

Synthesis of Polyamic Acid C1

In a 200-ml four-neck flask having inlets for inserting a thermometer, for inserting a stirrer, for feeding the materials and for introducing nitrogen gas, a diamine component (consisting of 2.2391 g of DPM and 0.2988 g of PMBCh) was dissolved in 43.69 g of dehydrated NMP with stirring under a stream of dry nitrogen gas. While the temperature of the reaction system was maintained between 5° C. and 70° C., a tetracarboxylic dianhydride component (consisting of 1.2964 g of PMDA and 1.1657 g of CBDA) was added to allow reaction for 5 to 30 hours, then 55.49 g of BC was added to obtain the polyamic acid C1 having a polymer content of 5% by weight. When the temperature is elevated due to the heat of reaction of the materials, the reaction temperature was maintained at 70° C. or below and the reaction was continued.

In the embodiment of the present invention, the viscosity of the polyamic acid was checked during the reaction, and when the viscosity after the addition of BC reached 35 to 40 mPa·s (E-type viscometer, at 25° C.), the reaction was stopped, and the resulted polyamic acid C1 was stored at low temperature, as in the synthesis of the polyamic acid A1.

Synthesis of Polyamic Acids C2 to C4

Polyamic acids C2 to C4 were synthesized in the same manner as for the polyamic acid C1. The weights of materials used are shown in Table 5. Table 6 shows the mole percentage of each material. The same types and quantities of solvents were used as in the synthesis of the polyamic acid C1. That is, the initial polyamic acid was synthesized by use of NMP alone, then BC was added to adjust the final polyamic acid content to 5% by weight.

TABLE 5

Weights of materials used in Synthetic Example C

| | Weights of material components (g) | | | |
|---|---|---|---|---|
| | Acid dianhydride | | Diamine component | |
| Synthetic Example | PMDA | CBDA | DPM | PMBCh |
| C1 | 1.2964 | 1.1657 | 2.2391 | 0.2988 |
| C2 | 1.2512 | 1.1250 | 2.0471 | 0.5768 |

TABLE 5-continued

Weights of materials used in Synthetic Example C

| Synthetic | Weights of material components (g) | | | |
|---|---|---|---|---|
| | Acid dianhydride | | Diamine component | |
| Example | PMDA | CBDA | DPM | PMBCh |
| C3 | 1.2089 | 1.0870 | 1.8681 | 0.8359 |
| C4 | 1.1325 | 1.0118 | 1.5441 | 1.3051 |

TABLE 6

Mole ratios of materials used in Synthetic Example C

| Synthetic | Weights of material components (g) (moles %) | | | |
|---|---|---|---|---|
| | Acid dianhydride | | Diamine component | |
| Example | PMDA | CBDA | DPM | PMBCh |
| C1 | 25 | 25 | 47.5 | 2.5 |
| C2 | 25 | 25 | 45.0 | 5.0 |
| C3 | 25 | 25 | 42.5 | 7.5 |
| C4 | 25 | 25 | 37.5 | 12.5 |

Examples 1–6 and Comparative Examples 1–5

These examples were prepared from the polyamic acid B1 serving as the plyamic acid B and various polyamic acids A. The results of examination of electrical properties and pre-tilt angles are shown.

1) Preparation of Mixed Coating Solution

Mother liquors A1 to A6 synthesized in Examples A1 to A6, and the mother liquor B1 synthesized in Example B1 (polymer content=5% by weight for both A and B) were used. These were mixed so that each mixture consisted of 91% by weight polyamic acid A and 9% by weight polyamic acid B, and each mixture was diluted with a mixed solvent of NMP and BC (1:1) so that the total polymer content became 3% by weight to form coating solution.

2) Preparation of Cells for Evaluating Electrical Properties

The coating solution was applied with a spinner onto a glass substrate having a transparent electrode ITO. The substrate was pre-heated at 80° C. for about 5 minutes, then heated at 200° C. for 30 minutes to convert the polyamic acid into a polyimide.

Next, the surface of the substrate on which an aligning film was formed was rubbed with a rubbing machine for aligning treatment, and after cleaning with an ultrasonic cleaner in ethanol for 5 minutes, the surface was rinsed with a flowing fluorochlorocarbon, and dried in an oven at 120° C. for 30 minutes.

A gap material for 7 μm was spread on the aligning film, the substrates were assembled with their surfaces on which aligning films were formed facing in, and the periphery of the substrates was sealed with an epoxy resin to leave an inlet for injected liquid crystals to form an antiparallel cell having a 7 μm gap.

A liquid crystal composition shown below was injected into the cell as a liquid crystalline material, and the injecting inlet was sealed with a photo-curing adhesive, which was cured by UV irradiation to seal the liquid crystal.

Next, the cell was subjected to heat treatment at 110° C. for 30 minutes to form a cell for evaluating electrical properties. The constituents of the liquid crystal composition used are shown in formulas 23 and 24 below. The NI point and birefringence of the composition were 81.3° C. and 0.092, respectively.

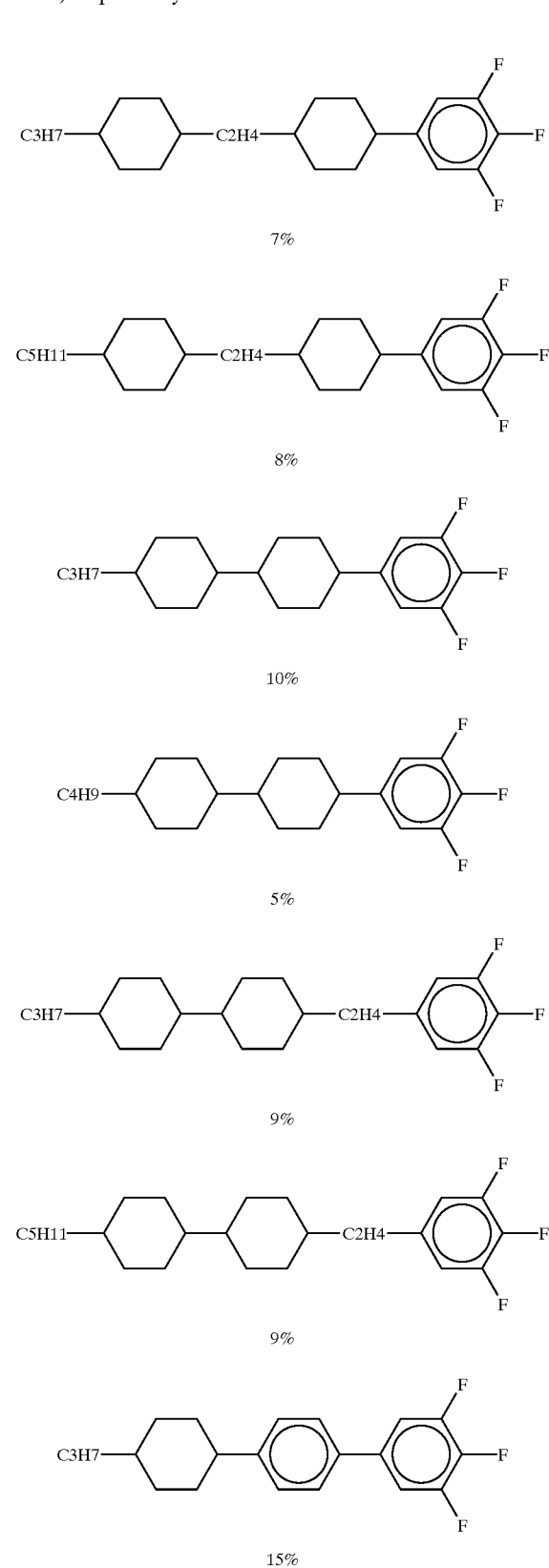

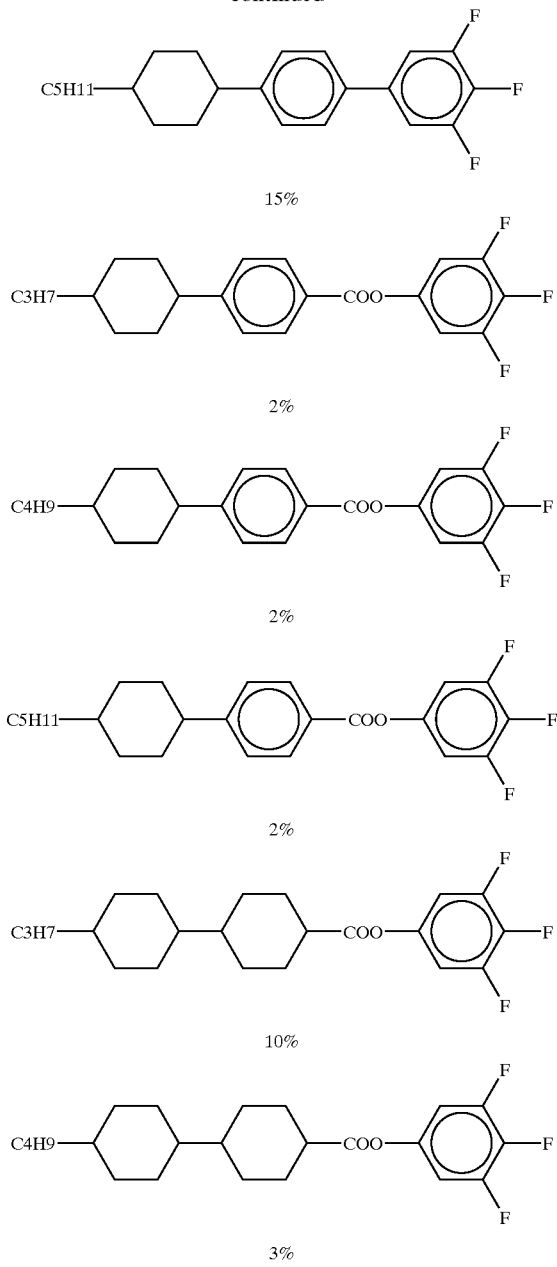

3) Measurement of Residual Voltage

Figure 1:
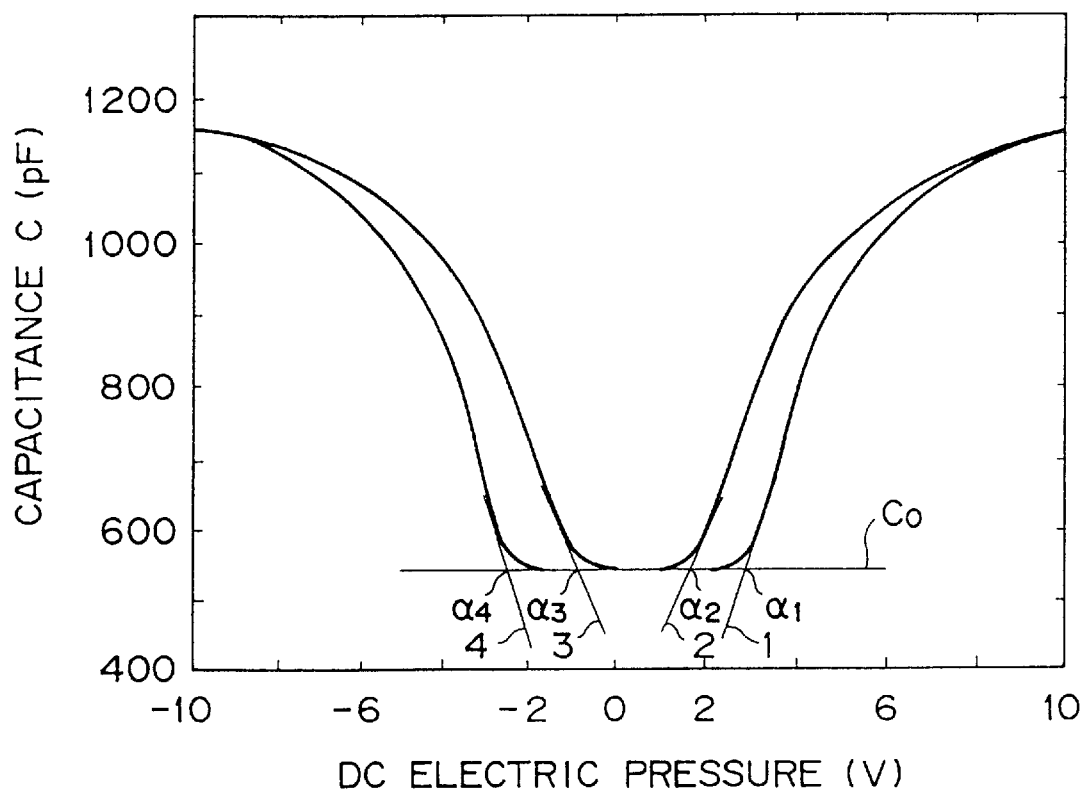
FIG. 1 shows a diagram showing a C-V hysteresis.

The residual voltage of liquid crystal cells was determined by measuring the C-V property shown in FIG. 1.

An alternating current of 50 mV, 1 kHz was impressed to a liquid crystal cell, on which triangular waves of a direct current of a frequency of 0.0036 Hz were overlapped, and the DC voltages were swept as 0 V→+10 V→0 V→−10 V→0 V to obtain the width of hysteresis shown in FIG. 1 from the following equation to determine residual voltage.

$$\text{Residual voltage (V)} = (|\alpha_1 - \alpha_2| + |\alpha_4 - \alpha_3|)/2$$

4) Measurement of Voltage Holding Ratio

Figure 3:
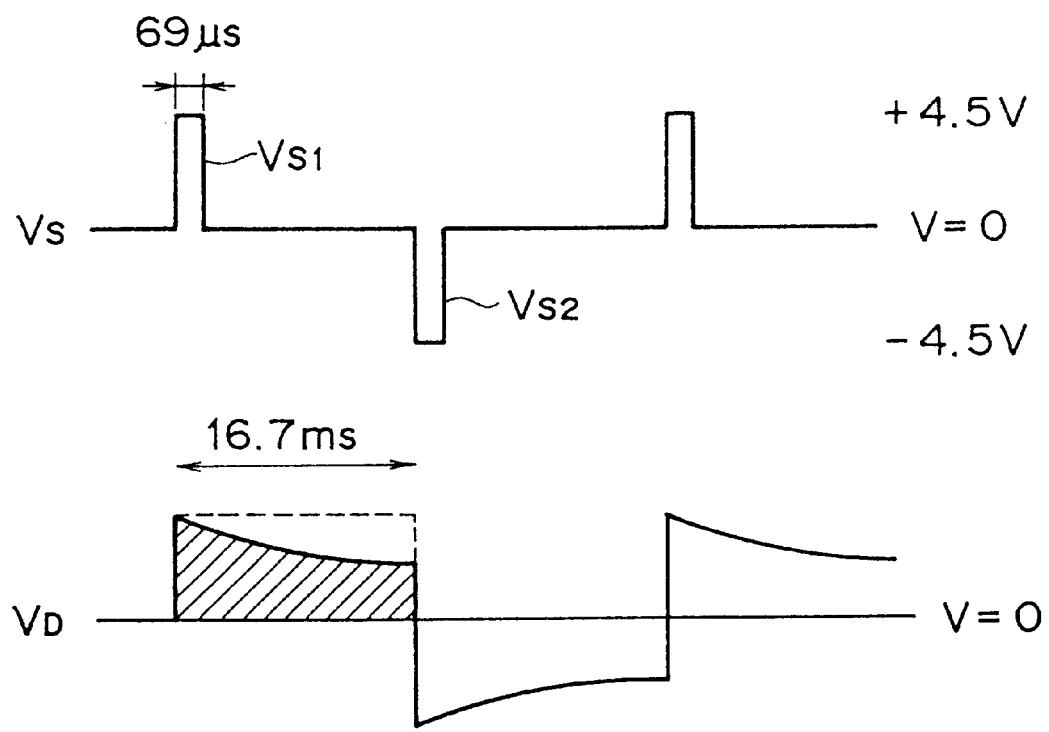
FIG. 3 is a diagram showing a square wave.

The voltage holding ratio was determined by reading from an oscilloscope the drain voltage (Vp) varied by impressing square waves (Vs) of a gate width of 69 μs, a frequency of 60 Hz, and an amplitude of ±4.5 V to the source, as FIGS. 2 and 3 show. If the voltage holding ratio is 100%, Vp shown in FIG. 3 will be rectangular as shown by dotted lines, but normally, it decreases as shown by the solid line gradually approaching 0. The voltage holding ratio was calculated from the area shown by oblique lines and the area shown by dotted lines, and is expressed by the percentage of the area shown by oblique lines. Therefore, 100% is the maximum value of the voltage holding ratio.

Since these measurement methods were used for measuring the residual voltage and the voltage holding ratio of all the samples, the description of these methods for measuring the residual voltage and the voltage holding ratio of the following Examples and Comparative Examples are omitted. The pre-tilt angle was measured by the method described later.

The results of measuring the residual voltage, the voltage holding ratio, and the pre-tilt angle are shown in Table 7.

TABLE 7

Examples 1–6 and Comparative Examples 1–5

| Ex. And C.E. | Ratio of polyamic acid A/B | Composition of polymer A (mol %) | | | | | | Residual voltage (mV) | Voltage holding ratio (%) | Pre-tilt angle (°) |
|---|---|---|---|---|---|---|---|---|---|---|
| | | Acid component | | Diamine component | | | | | | |
| | 91/9 | PMDA | CBDA | DPM | DPP | DPPP | DPEr | | | |
| Ex. 1 | A1/B1 | 0 | 50 | 50 | | | | 87 | 98.2 | 5.3 |
| Ex. 2 | A2/B1 | 15 | 35 | 50 | | | | 72 | 96.8 | 5.4 |
| Ex. 3 | A3/B1 | 20 | 30 | 50 | | | | 43 | 97.3 | 5.4 |
| Ex. 4 | A4/B1 | 25 | 25 | 50 | | | | 35 | 97.6 | 5.3 |
| Ex. 5 | A5/B1 | 35 | 15 | 50 | | | | 19 | 97.8 | 4.9 |
| Ex. 6 | A6/B1 | 25 | 25 | | 50 | | | 48 | 98.3 | 5.3 |
| C.E. 1 | A7/B1 | 50 | 0 | 50 | | | | 164 | 94.3 | 3.9 |

TABLE 7-continued

Examples 1–6 and Comparative Examples 1–5

| Ex. And C.E. | Ratio of polyamic acid A/B | Composition of polymer A (mol %) | | | | | | Residual voltage (mV) | Voltage holding ratio (%) | Pre-tilt angle (°) |
|---|---|---|---|---|---|---|---|---|---|---|
| | | Acid component | | Diamine component | | | | | | |
| | 91/9 | PMDA | CBDA | DPM | DPP | DPPP | DPEr | | | |
| C.E. 2 | A8/B1 | 25 | 25 | | 50 | | | 253 | 95.8 | — |
| C.E. 3 | A9/B1 | 25 | 25 | | | | 50 | 230 | 94.3 | — |
| C.E. 4 | B1 only | | | | | | | 750 | 97.1 | 4.5 |
| C.E. 5 | A4 only | 25 | 25 | 50 | | | | 180 | 98.0 | 1.0 |

*Ex. = Example; C.E. = Comparative Example
Polymer composition of B1: PMDA/DPEt/PMBCh = 50/25/25

From the above results it is known that in the polyamic acid A, CBDA is more preferable than PMDA as the tetracarboxylic dianhydride component, and the combination of CBDA and PMDA provides less residual voltage than does CBDA alone. By comparison of Comparative Examples 4 and 5 with Example 4, it is known that the mixed system provides considerably less residual voltage. When a diamine having ether groups is used as the diamine component of the polymer composition of the polyamic acid A, the residual voltage increases.

Examples 7–10 and Comparative Example 6

In these Examples and Comparative Examples are shown the results of residual voltage measurement when the polyamic acid A4 is mixed with various polyamic acids B.

1) Preparation of Coating Solution

Mother liquor A4 synthesized in Example A4, and the mother liquors B1 to B5 synthesized in Examples B1 to B5 (polymer content=5% by weight for both A and B) were used. These were mixed so that each mixture consisted of 80% by weight polyamic acid A4 and 20% by weight polyamic acid B, and each mixture was diluted with a mixed solvent of NMP and BC (1:1) so that the total polymer content became 3% by weight to form coating solution.

2) Preparation of Cells for Evaluating Electrical Properties

Cells for evaluating electrical properties were prepared in the same manner as in Example 1.

Table 8 shows the results for Examples 7 to 10 and Comparative Example 6.

TABLE 8

Examples 7–10 and Comparative Example 6

| Ex. And C.E. | Ratio of polyamic acids 80/20 | Composition of polyamic acid B (mole %) | | | | | | Residual voltage (mV) | Pre-tilt angle |
|---|---|---|---|---|---|---|---|---|---|
| | | Acid component | | Diamine component | | | | | |
| | | PMDA | CBDA | PMBCh | DPEt | DPM | FM3307 | | |
| Ex. 7 | A4/B1 | 50 | | 25 | 25 | | | 48 | 5.0 |
| Ex. 8 | A4/B2 | 50 | | 50 | | | | 64 | 9.8 |
| Ex. 9 | A4/B3 | 25 | 25 | 25 | | 25 | | 20 | 3.3 |
| Ex. 10 | A4/B4 | 50 | | 17.5* | 32.5 | | | 78 | 4.0 |
| C.E. 6 | A4/B5 | 25 | 25 | 25 | | | 25 | 50*1 | 0.7 |

Ex. = Example; C.E. = Comparative Example
Pre-tilt angle of polyamic acid B1 = 4.5°, B2 = 8.4°, B3 = 3.0°, B4 = 2.8°, A4 = 1.0°
No tilt angle was found in B5 due to the disorder of liquid crystalline molecules.
Polymer composition of A4: PMDA/CBDA/DPM = 25/25/50
*Diamine component in Example 10 = PPPCC
*1 No alignment of liquid crystalline molecules was found in this mixture system.

From the above results, it is known that the combined use of DPEt or DPM of the present invention for the polyamic acid B decreases residual voltage. Comparative Example 6 showed that it may not be suitable as the aligning film for liquid crystal display elements due to poor alignment of liquid crystalline molecules depending on the diamine component.

Example 11–15 and Comparative Example 6, 7, 11

In these Examples and Comparative Examples, there were measured residual voltage, voltage holding ratios, pre-tilt angles and current with changing the ratio of the polyamic acid A4 and B3, and currents before and after heat treatment were also measured.

1) Preparation of Coating Solution

The mother liquor A4 synthesized in Example A4, and the mother liquor B3 synthesized in Example B3 (polymer content=5% by weight for both A and B) mixed in the proportions shown in Table 9 were used. Each mixture was diluted with a mixed solvent of NMP and BC (1:1) so that the total polymer content became 3% by weight to form coating solution.

2) Preparation of Cells for Evaluating Electrical Properties

Cells for measuring residual voltage and voltage holding ratio were prepared from the above coating solution in the same manner as in Example 1.

3) Preparation of Cells for Measuring Pre-tilt Angles

Cells for measuring pre-tilt angles were prepared in the same manner as in the preparation of cells for evaluating electrical properties except that anti-parallel cells of a cell thickness of 20 μm were prepared through use of a gap material for 20 μm. The liquid crystal materials for pre-tilt angle measurement were the same as the liquid crystal materials used for measuring electrical properties.

4) Measurement of Pre-tilt Angles

The pre-tilt angles of liquid crystals were measured by the crystal rotation method normally used.

Table 9 shows the results of measurement of electrical properties and pre-tilt angles in these Examples and Comparative Examples. The pre-tilt angle of Comparative Example 6 shown in Table 8 was also measured.

5) Evaluation of Current

Initial current of cells used for measuring the residual voltage and holding ratio was measured at first. After these cells were heated at 110° C. for 72 hours and allowed to stand to room temperature, the current was measured again. Current ratio was calculated by dividing the value of current after 72 hours heat treatment by that of the initial current.

Conditions for measuring current
Voltage impressed: 10 V (32 Hz)
The electrode area of these cells is 1 cm$^2$.

TABLE 9

Ratio of polyamic acids A/B, electrical properties, and pre-tilt angle

| | | Results of measurements | | | | | |
|---|---|---|---|---|---|---|---|
| | Ratio of | | Voltage | | Current $\mu A/cm^2$ | | |
| Ex. And C.E. | polyamic acids B3/A4 | Residual voltage (mV) | holding ratio (%) | Pre-tilt angle (°) | Initial | 72 hours later | Ratio |
| C.E. 11 | 0/100 | 180 | 98.0 | 1.1 | 1.33 | 1.35 | 1.02 |
| Ex. 11 | 5/95 | 41 | 98.2 | 4.8 | — | — | — |
| Ex. 12 | 10/90 | 8 | 98.4 | 5.2 | 1.35 | 1.38 | 1.02 |
| Ex. 13 | 20/80 | 20 | 98.0 | 5.3 | — | — | — |
| Ex. 14 | 30/70 | 52 | 97.9 | 5.3 | — | — | — |
| Ex. 15 | 50/50 | 170 | 97.2 | 5.4 | 1.39 | 1.56 | 1.12 |
| C.E. 7 | 100/0 | 500 | 96.0 | 5.5 | 1.42 | 2.07 | 1.46 |
| C.E. 6 | B5/A4 | 50 | — | 0.7 | — | — | — |

Ex. = Example; C.E. = Comparative Example

The above results show that for residual voltage, the polyamic acid containing about 10% by weight of B3 has a minimum. For voltage holding ratio, on the other hand, the polyamic acid containing about 10% by weight of B3 has a maximum, and exhibits almost the same value as that of the polyamic acid A4. Also, the polyamic acid containing about 10% by weight of B3 exhibits almost the same pre-tilt angle as that of B3. That is, when the content of the polyamic acid B3 is in the vicinity of 10% by weight, or in the range between 10% and 20% by weight, it exhibits small residual voltage, large voltage holding ratio, and a pre-tilt angle comparable to the pre-tilt angle of the polyamic acid B3 alone. These results are summarized in FIG. 4, which shows a range of good balance among pre-tilt angle, residual voltage, and voltage holding ratio. That is, in this composition system, the optimum composition is present when the content of the polyamic acid B is in the vicinity of about 10% by weight.

Table 9 shows that the current ratio which is an index for reliability of cells is smaller when the composition of the present invention are used. In Comparative Example 6, although residual voltage is small, the alignment of liquid crystals is poor and the pre-tilt angle is small.

Comparative Examples 5 and 8–12

In these examples are shown the results of comparison of residual voltage and pre-tilt angle between the copolymer systems of the material composition and the mixed systems shown in Table 10.

1) Preparation of Coating Solution

Mother liquors C1 to C4 (polymer content=5% by weight for each polymer) was diluted with a mixed solvent of NMP and BC (1:1) so that the total polymer content became 3% by weight to form coating solution.

2) Preparation of Cells for Evaluating Electrical Properties and Measuring Pre-tilt Angle Cells for measuring electrical properties and pre-tilt angles shown in Examples 11 to 15 were prepared from the above coating solution in the same manner as in Example 1.

3) Measurement of Residual Voltage and Voltage Holding Ratio

The residual voltage and voltage holding ratio were measured in the same manner as described above.

Table 10 shows the results of the electrical properties and pre-tilt angles measured for these samples.

TABLE 10

Comparison of copolyamic acids and mixed polyamic acids

| | | | Results of measurement | | | |
|---|---|---|---|---|---|---|
| | | | Residual voltage (mV) | | Pre-tilt angle (°) | |
| Ex. And C.E. | Ratio of polyamic acids* B3/A4 | Polymer used* | Co-polymer system | Mixed system | Co-polymer system | Mixed system |
| C.E. 5 | 0/100 | A4 | 180 | 180 | 1.1 | 1.1 |
| C.E. 9 | 10/90 | C1 | 216 | 8 | 1.5 | 5.2 |
| C.E. 10 | 20/80 | C2 | 236 | 20 | 2.0 | 5.3 |
| C.E. 11 | 30/70 | C3 | 270 | 52 | 2.4 | 5.3 |
| C.E. 12 | 50/50 | C4 | 350 | 170 | 3.4 | 5.4 |
| C.E. 8 | 100/0 | B3 | 500 | 500 | 5.5 | 5.5 |

Ex. = Example; C.E. = Comparative Example
*The ratios of each tetracarboxylic dianhydride and each diamine in copolymer system are the same as the corresponding mixed system.

These Comparative Examples were prepared for comparing the polyamic acids in the copolymer system of Examples 11 to 15 with those in the mixed system in the same material proportions. As discussed in the previous paragraph, in the mixed system, the pre-tilt angle of the polyamic acid A4 was achieved when the content of the polyamic acid B3 was about 10% by weight, while in the copolymer system, the pre-tilt angle was almost arithmetic mean. On the other hand, concerning the residual voltage, a minimum is present when the content of the polyamic acid B3 is in the vicinity of 10% by weight in the mixed system as described above, while the copolymer system exhibits a nearly arithmetic mean with residual voltage, as is the case with the pre-tilt angle, but exhibits no minimum. In the copolymer system, therefore, properties simultaneously satisfying the requirements for residual voltage, voltage holding ratio, and pre-tilt angle cannot be obtained.

Examples 16–19 and Comparative Examples 13–14

In these examples are shown the results of examinations on the aligning film manufacturing process (dependence on the temperature of pre-heating condition) and the pre-tilt angles of the mixed system consisting of polyamic acids A4 and B4.

1) Preparation of Coating Solution

The mother liquor A4 and the mother liquor B4 (polymer content=5% by weight for each polymer) were mixed so that the proportions of the polyamic acid B4 to the polyamic acid A4 became those shown in Table 11, and the resultant mixtures were diluted with a mixed solvent of NMP and BC (1:1) so that the total polymer content became 3% by weight to form coating solution.

2) Preparation of Cells for Measuring Pre-tilt Angle

Cells for measuring pre-tilt angles shown in Example 8 were prepared from the above coating solution in the same manner as in Example 1.

3) Measurement of Pre-tilt Angles

The pre-tilt angles were measured in the same manner as described above.

Table 11 shows the results of the pre-tilt angles measured for these samples.

TABLE 11

Content of polyamic acid B4 and dependence of pre-tilt angle on pre-heating temperatures

| Ex. and C.E. | Content of polyamic acid B4 (wt %) | Pre-tilt angle (°) Pre-heating temperature (° C.) | | | Ratio of pre-tilt angles |
|---|---|---|---|---|---|
| | | 60 | 80 | 100 | 100° C./60° C. |
| C.E. 13 | 4.0 | 5.8 | 4.9 | 3.8 | 0.66 |
| Ex. 16 | 6.0 | 6.2 | 6.0 | 5.7 | 0.92 |
| Ex. 17 | 8.0 | 6.2 | 6.2 | 6.1 | 0.98 |
| Ex. 18 | 10.0 | 6.1 | 6.2 | 6.2 | 1.02 |
| Ex. 19 | 20.0 | 6.0 | 6.0 | 6.1 | 1.02 |
| C.E. 14 | 100.0 | 5.9 | 5.9 | 5.9 | 1.00 |

Ex. = Example; C.E. = Comparative Example

From the above results it is known that if the content of the polyamic acid B4 in the polyamic acid component is small, pre-tilt angle exhibits dependence on the temperature of pre-heating. Although the higher content of the polyamic acid B4 provides smaller dependence on the temperature of pre-heating, the preferable content of the polyamic acid B4 is 50% by weight at highest, because the high content of the polyamic acid B4 affects the electrical properties as described above. The lower limit of the content depends on the combination of the polyamic acid A and the polyamic acid B, but the content of the polyamic acid B of 4% by weight or less is not preferable, because the dependence on the temperature of pre-heating increases, and the variation of the pre-tilt angle also increases.

Industrial Applicability

From a liquid crystal aligning film produced by mixing the polyamic acid A and the polyamic acid B of the present invention, there can be obtained an excellent liquid crystal display element which has a large pre-tilt angle, a small residual voltage, and an excellent voltage holding ratio, as well as a stable pre-tilt angle having a small process dependence. Also, by utilizing the aligning film of the present invention, there can be obtained a highly reliable liquid crystal display element of low current and small change in current after exposure to high temperature.

What is claimed is:

1. A polyamic acid composition comprising a polyamic acid providing a polyimide resin giving a residual voltage of 200 mV or less and a voltage holding ratio of 97% or higher, and a polyamic acid providing a polyimide resin giving a pre-tilt angle of 3–15°, the weight ratio of the former polyimide resin to the latter polyimide resin being 50/50 to 95/5.

2. A polyamic acid composition comprising a polyamic acid A and a polyamic acid B, wherein the essential acid component of the polyamic acid A is an alicyclic tetracarboxylic dianhydride, the main diamine component of the polyamic acid A is a diamine selected from the aromatic diamines represented by the following formula (1), the acid component of the polyamic acid B contains 50 mole % or more aromatic tetracarboxylic dianhydride, and the essential diamine component of the polyamic acid B is a diamine having a group enabling the pre-tilt angle of a liquid crystal to be increased on the side chain thereof, the weight ratio A/B of the polyamic acid A to the polyamic acid B being 50/50 to 95/5

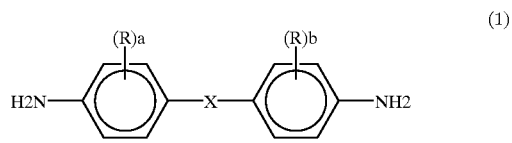

(1)

where, X is a divalent aliphatic group, each R is independently a hydrogen atom or $CH_3$, and a and b are 1 to 2.

3. A polyamic acid composition according to claim 2, wherein the acid component of the polyamic acid A comprises an alicyclic tetracarboxylic dianhydride and an aromatic tetracarboxylic dianhydride.

4. A polyamic acid composition according to claim 2, wherein the diamine component of the polyamic acid B comprises at least one diamine having a group enabling the pre-tilt angle of a liquid crystal to be increased on the side chain thereof, and a diamine represented by the formula (1).

5. A polyamic acid composition according to claim 2, wherein the acid component of the polyamic acid A comprises an alicyclic tetracarboxylic dianhydride and an aromatic tetracarboxylic dianhydride, and the diamine component of the polyamic acid B comprises at least one of the diamines represented by formulas (2) and (3), or a diamine comprising said diamine and the diamine represented by formula (1).

6. A polyamic acid composition according to claim 2, wherein the acid component of the polyamic acid A comprises an alicyclic tetracarboxylic dianhydride and an aromatic tetracarboxylic dianhydride, the mole ratio of the former to the latter being 90/10 to 10/90, and the diamine component of the polyamic acid B comprises at least one of the diamines represented by formulas (2) and (3), or a diamine comprising said diamine and the diamine represented by formula (1).

7. A polyamic acid composition according to claim 2, wherein the main acid component of the tetracarboxylic dianhydride of polyamic acid A is cyclobutane tetracarboxylic dianhydride, the acid component of the polyamic acid B contains 50 mole % or more of pyromellitic dianhydride, and the diamine component of the polyamic acid B comprises at least one of the diamines represented by formulas (2) and (3), or a diamine comprising said diamine and the diamine represented by formula (1).

8. A polyamic acid composition according to claim 2, wherein the acid component of the tetracarboxylic dianhydride of the polyamic acid A comprises cyclobutane tetracarboxylic dianhydride and pyromellitic dianhydride, and the diamine component of the polyamic acid B comprises at least one of the diamines represented by formulas (2) and (3), or a diamine comprising said diamine and the diamine represented by formula (1).

9. A polyamic acid composition according to claim 2, wherein the acid component of the tetracarboxylic dianhydride of the polyamic acid A comprises cyclobutane tetracarboxylic dianhydride and pyromellitic dianhydride, the acid component of the polyamic acid B contains 50 mole % or more of pyromellitic dianhydride, and the diamine component of the polyamic acid B comprises at least one of a diamine represented by formula (2) and a diamine represented by formula (3), or a diamine comprising said diamine and the diamine represented by formula (1).

10. A polyamic acid composition according to claim 2, wherein the acid component of the polyamic acid A comprises pyromellitic dianhydride and cyclobutane tetracarboxylic dianhydride, the mole ratio of the former to the latter being 90/10 to 10/90, the acid component of the polyamic acid B contains 50 mole % or more of pyromellitic dianhydride and the diamine component of the polyamic acid B comprises at least one of the diamine represented by formula (2) and a diamine represented by formula (3), or a diamine comprising said diamine and the diamine represented by formula (1).

11. A polyamic acid composition according to claim 2, wherein the acid component of the polyamic acid A comprises pyromellitic dianhydride and cyclobutane tetracarboxylic dianhydride, the mole ratio of the former to the latter being 90/10 to 10/90, the diamine component of the polyamic acid A is a diamine represented by formula (1), where X is $CH_2$ or $CH_2CH_2$, and each R is a hydrogen atom, the acid component of the polyamic acid B contains 50 mole % or more of pyromellitic dianhydride, and the diamine component of the polyamic acid B comprises at least one of a diamine represented by formula (2) and a diamine represented by formula (3), or a diamine comprising said diamine and the diamine represented by formula (1).

12. An aligning film containing a polyimide resin obtained from a composition according to any one of claim 1.

13. A liquid crystal display element using an aligning film for a liquid crystal display element according to claim 12.

14. A TFT liquid crystal display element according to claim 13 using a liquid crystal composition mainly comprising the following compounds:

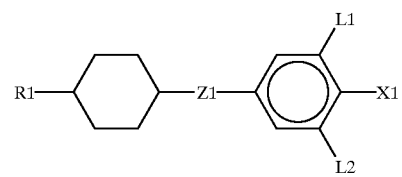

(4)

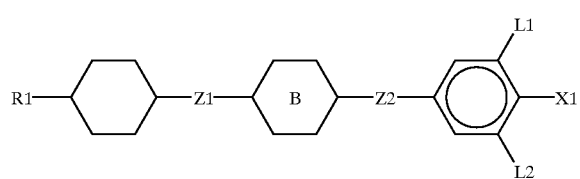

(5)

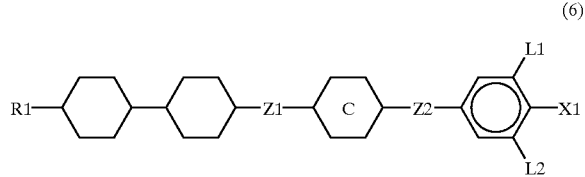

(6)

where, R1 represents an alkyl group having 1 to 10 carbon atoms, in which optional, nonadjacent methylene groups may be substituted by —O— or —CH=CH—, and optional hydrogen atoms of the group may be substituted by fluorine atoms; X1 represents a fluorine atom, a chlorine atom, —$OCF_3$, —$OCF_2H$, —$CF_3$, —$CF_2H$, —$CFH_2$, —$OCF_2CF_2H$, or —$OCF_2CFHCF_3$; each of L1 and L2 independently represents a hydrogen atom or a fluorine atom; each of Z1 and Z2 independently represents 1,2-ethylene, 1,4-butylene, —COO—, —$CF_2O$—, —$OCF_2$—, —CH=CH—, or a single bond; Ring B represents trans-1,4-cyclohexylene, 1,3-dioxane-2,5-diyl, or 1,4-phenylene in which hydrogen atoms may be substituted by fluorine atoms; and Ring C represents trans-1,4-cyclohexylene, or 1,4-phenylene in which hydrogen atoms may be substituted by fluorine atoms.

15. A liquid crystal alignment material containing a polyamic acid composition according to claim 2.

16. A polyamic acid composition according to claim 2, wherein the essential diamine component of the polyamic acid B comprises at least one of the diamines represented by the following formulas (2) and (3),

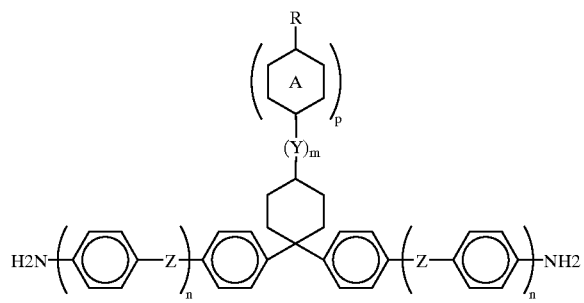

(2)

where R is a hydrogen atom or an alkyl group having 1 to 12 carbon atoms, Y is a $CH_2$ group, m is an integer from 0 to 2, A is a benzene ring or a cyclohexane ring, p is 0 or 1, Z is an oxygen atom or a $CH_2$ group, and n is 0 or 1,

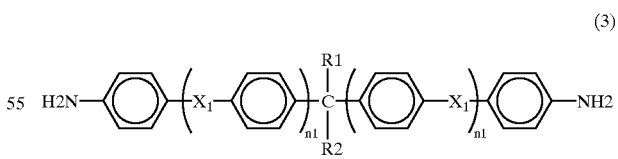

(3)

where X1 is a $CH_2$ group or an oxygen atom, each of R1 and R2 is independently a hydrogen atom, or an alkyl group or a perfluoroalkyl group having 1 to 12 carbon atoms, at least one of R1 and R2 being an alkyl group or a perfluoroalkyl group having 3 or more carbon atoms, and n1 is 0 or 1.

17. A polyamic acid composition according to claim 2, comprises the diamine component of the polyamic acid B comprises at least one of the diamines represented by formulas (2) and (3) as follows:

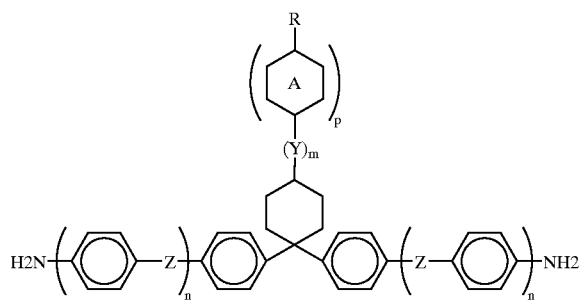
(2)

where R is a hydrogen atom or an alkyl group having 1 to 12 carbon atoms, Y is a CH$_2$ group, m is an integer from 0 to 2, A is a benzene ring or a cyclohexane ring, p is 0 or 1, z is an oxygen atom or a CH$_2$ group, and n is 0 or 1;

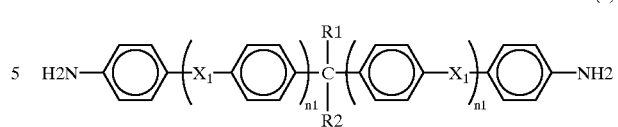
(3)

where X1 is a CH$_2$ group or an oxygen atom, each of R1 and R2 is independently a hydrogen atom, or an alkyl group or a perfluoroalkyl group having 1 to 12 carbon atoms, at least one of R1 and R2 being an alkyl group or perfluoralkyl group having 3 or more carbon atoms, and n1 is 0 or 1; and the diamine represented by formula (1);

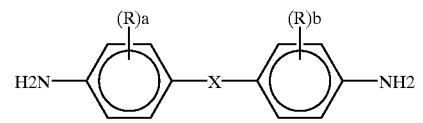
(1)

where, X is a divalent aliphatic group, each R is independently a hydrogen atom or CH$_3$, and a and b are 1 to 2.

* * * * *